United States Patent
Kim et al.

(10) Patent No.: US 11,245,290 B2
(45) Date of Patent: Feb. 8, 2022

(54) APPARATUS AND METHOD FOR PERFORMING TRANSMISSION AND RECEPTION OF WIRELESS POWER

(71) Applicant: LG ELECTRONICS INC., Seoul (KR)

(72) Inventors: Dongkyu Kim, Seoul (KR); Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/047,526

(22) PCT Filed: Apr. 24, 2018

(86) PCT No.: PCT/KR2018/004733
§ 371 (c)(1),
(2) Date: Oct. 14, 2020

(87) PCT Pub. No.: WO2019/208843
PCT Pub. Date: Oct. 31, 2019

(65) Prior Publication Data
US 2021/0152022 A1    May 20, 2021

(51) Int. Cl.
*H02J 50/20* (2016.01)
*H02J 50/80* (2016.01)
(Continued)

(52) U.S. Cl.
CPC ............ *H02J 50/20* (2016.02); *H01Q 1/248* (2013.01); *H01Q 1/525* (2013.01); *H02J 50/001* (2020.01);
(Continued)

(58) Field of Classification Search
CPC .. H02J 50/20; H02J 50/80; H02J 50/40; H02J 50/001
See application file for complete search history.

(56) References Cited

U.S. PATENT DOCUMENTS

2007/0210960 A1* 9/2007 Rofougaran ............. H01Q 3/26
342/368
2009/0312046 A1 12/2009 Clevenger et al.
(Continued)

FOREIGN PATENT DOCUMENTS

KR     101402784     6/2014
KR     101639950     7/2016
(Continued)

*Primary Examiner* — Hal Kaplan
*Assistant Examiner* — Joseph N Inge
(74) *Attorney, Agent, or Firm* — Dentons US LLP

(57) ABSTRACT

The present disclosure relates to an apparatus and a method for performing transmission and reception of wireless power. The apparatus comprises: a transmission signal processing unit configured to generate a transmission data signal and perform a modulation and an amplification; a transmission antenna configured to convert the transmission data signal into an RF signal and transmit the RF signal; at least one reception antenna configured to receive at least one of the RF signal or an external signal received from the outside; a wireless power reception unit configured to harvest power from the RF signal received through the at least one reception antenna; and a reception signal processing unit configured to demodulate the external signal received through the at least one reception antenna. Since the RF signal, which is radiated by the apparatus itself, is received again and utilized for power charging, energy can be recycled.

16 Claims, 22 Drawing Sheets

(51) Int. Cl.
*H02J 50/40* (2016.01)
*H02J 50/00* (2016.01)
*H01Q 1/24* (2006.01)
*H01Q 1/52* (2006.01)

(52) U.S. Cl.
CPC .............. *H02J 50/40* (2016.02); *H02J 50/80* (2016.02); *H01Q 1/242* (2013.01)

(56) References Cited

U.S. PATENT DOCUMENTS

| | | | | |
|---|---|---|---|---|
| 2015/0115735 A1* | 4/2015 | Singh | ...................... | H02J 5/005 |
| | | | | 307/104 |
| 2015/0155739 A1* | 6/2015 | Walley | ................ | H04B 5/0037 |
| | | | | 320/108 |
| 2015/0340876 A1* | 11/2015 | Walley | .................... | H02J 50/12 |
| | | | | 307/104 |
| 2016/0156388 A1* | 6/2016 | Zeine | .................... | H04W 76/14 |
| | | | | 307/104 |
| 2017/0077761 A1* | 3/2017 | Younis | ..................... | H02M 7/06 |
| 2017/0098962 A1* | 4/2017 | Desrosiers | ............ | H02M 3/158 |
| 2017/0194807 A1* | 7/2017 | Zeine | ..................... | H02J 7/045 |
| 2017/0230916 A1* | 8/2017 | Stein | ........................ | H04W 4/38 |
| 2017/0250559 A1* | 8/2017 | Narayanan | ............... | H02J 7/025 |
| 2017/0331330 A1* | 11/2017 | Yeo | ......................... | H02J 50/23 |
| 2019/0181685 A1* | 6/2019 | Su | ........................ | H04B 5/0031 |
| 2019/0252794 A1* | 8/2019 | Saito | ........................ | H01Q 21/06 |
| 2019/0379232 A1* | 12/2019 | Lemdiasov | ............. | H02J 50/12 |

FOREIGN PATENT DOCUMENTS

| | | | |
|---|---|---|---|
| KR | 101639950 B1 * | 7/2016 | |
| KR | 101710012 | 2/2017 | |

\* cited by examiner

APPARATUS AND METHOD FOR PERFORMING TRANSMISSION AND RECEPTION OF WIRELESS POWER

This application is the National Stage filing under 35 U.S.C. 371 of International Application No. PCT/KR2018/004733, filed on Apr. 24, 2018, the contents of which are hereby incorporated by reference herein in its entirety.

BACKGROUND OF THE DISCLOSURE

Field of the Disclosure

The present disclosure relates to wireless charging based on radio frequency (RF) communication and, more particularly, to a method and apparatus for performing transmission and reception of wireless power in a wireless communication system.

Related Art

With the rapid increase of terminal use time and data traffic amount of user owing to changed life pattern of user based on a smart phone and development of various types of applications, recently, the use rate in comparison with a battery charging cycle of user is also rapidly increased, which requires researches for different types of wireless charging scheme in addition to wired charging scheme and batteries. For this, recently, it has been vigorously progressed a research for RF energy harvesting technique which receives RF signals wirelessly from a device that transmits peripheral RF signals and transforms and utilizes it for energy source of a receiver like a base station for communication or an Access Point (AP) for transmitting an advertisement.

Generally, the RF energy harvesting technique is commonly called a method for obtaining energy by using peripheral environment. A transmitter to transmit energy transmits signals having a specific size of power carried on a frequency, and a receiver receives and uses it and transforms to energy. In this case, separate RF signals for harvesting may also be used, or it is also available harvesting using RF signals emitted in normal environment. The former case has very good harvesting efficiency since it uses all powers of RF signals for harvesting. However, since it requires separate resource allocations for harvesting, a restriction for resource use may occur for data communication.

In addition, during the process that RF signals transmitted from a transmitter arrives at a receiver for wireless power transmission, if path-loss attenuation occurs due to distance difference of transmission and reception period, the receiver has to receive significantly low power, and consequently, there is a problem that input/output efficiency in a rectifier in the receiver is decreased.

SUMMARY OF THE DISCLOSURE

The present disclosure provides a method and apparatus for transmission and reception of wireless power based on RF communication.

The present disclosure also provides a method and apparatus for performing wireless charging by using a data transmission and reception antenna available for transmitting and receiving RF data signals and a power reception antenna available for receiving RF data signals.

The present disclosure is also to perform power charging by receiving RF data transmission signals emitted by utilizing a dummy antenna and a reception antenna for wireless charging by using RF signals in an apparatus available to transmit and receive RF data.

The present disclosure is for an apparatus available to transmit/receive or transmit data to be provided with a (dummy) reception antenna and a device (impedance matching, rectifier, DC-DC converter, battery, etc.) for energy harvesting connected with it in the same apparatus for obtaining signal already transmitted as power.

In an aspect, a radio frequency (RF) based wireless power transmission and reception apparatus is provided. The apparatus includes a transmitting signal processing unit configured to generate a transmitting data signal and perform modulation and amplification of the transmitting data signal, a transmitting antenna configured to transform the transmitting the transmitting data signal to RF signal and transmit the RF signal, at least one receiving antenna configured to receive at least one of the RF signal or an external signal received from exterior, a wireless power receiving unit configured to harvest power from the RF signal received through the at least one receiving antenna, and a receiving signal processing unit configured to demodulate the external signal received through the at least one receiving antenna.

In an aspect, the at least one receiving antenna may include a power receiving antenna configured to receive the RF signal and a data receiving antenna configured to receive the external signal, wherein the power receiving antenna may be connected to the wireless power receiving unit, and wherein the data receiving antenna may be connected to the receiving signal processing unit.

In another aspect, the at least one receiving antenna may be provided at a position of receiving the RF signal in-phase from the transmitting antenna.

In another aspect, the position of receiving the RF signal in-phase may include a position in which all of distances between the transmitting antenna and the respective receiving antenna are identical.

In another aspect, the position of receiving the RF signal in-phase may include a position in which a distance between the transmitting antenna and the respective receiving antennas corresponds to an integer multiple of a wavelength of the RF signal.

In another aspect, the at least one receiving antenna may be provided at a position in which mutual coupling is minimized.

In another aspect, the position in which mutual coupling is minimized may include a position in which the at least one receiving antenna is disposed at every equiangular position along a line of a circle around the transmitting antenna at a center.

In another aspect, the apparatus may further include a phase shifter connected to a part of the at least one receiving antenna and configured to shift a phase of the RF signal or the external signal received through the connected receiving antenna.

In another aspect, all of distances between the transmitting antenna and respective receiving antennas are at an identical position, based on that only the RF signal is received through the connected receiving antenna, the phase shifter may skip shift a phase of the RF signal, and based on that the RF signal and the external signal are received through the connected receiving antenna simultaneously, the phase shifter may shift phases of the RF signal and the external signal by 180 degree.

In another aspect, distances between the transmitting antenna and respective receiving antennas corresponds to an integer multiple of a wavelength of the RF signal, based on that only the RF signal is received through the connected receiving antenna, the phase shifter may shift a phase of the RF signal by 180 degree, and based on that the RF signal and the external signal are received through the connected receiving antenna simultaneously, the phase shifter may skip shift phases of the RF signal and the external signal.

In another aspect, the apparatus may further include a switching unit configured to perform a switching that connects the at least one receiving antenna to either one of the wireless power receiving unit or the receiving signal processing unit selectively.

In another aspect, the switching unit may perform the switching according to a switching control signal generated based on at least one of information related to a transmission of the RF signal or information related to a reception of the external signal.

In another aspect, the information related to a transmission of the RF signal may be information representing a result of comparing an input source to the transmitting antenna or an input source in the transmitting signal processing unit with a threshold value.

In another aspect, the information related to a reception of the external signal may include scheduling information for a schedule for the RF based wireless power transmission and reception apparatus to receive the external signal.

In another aspect, wherein the switching control signal may be turned ON based on that the input source is the threshold value or greater and the scheduling information is not related to the reception of the external signal, and wherein the switching unit may connect the at least one receiving antenna to the wireless power receiving unit based on that the switching control signal is turned ON.

In another aspect, the apparatus may further include a feedback loop circuit configured to generate a phase control signal based on feedback information and input the phase control signal to the phase shifter.

In another aspect, the wireless power receiving unit may be configured to generate a DC output by rectifying the RF signal, and wherein the feedback information may be at least one of the DC output or a phase estimation value of the RF signal.

In another aspect, the apparatus may further include a coupler for diverging a part of RF signal from the RF signal going through the phase shifter, wherein the feedback loop circuit may estimate a phase of the RF signal from the diverged RF signal.

RF signals emitted by an apparatus are received again and utilized for power charging, recycling of energy is available. Path attenuation of RF signals input to a reception antenna is reduced, and consequently, power size received by the reception antenna is increased, and efficiency of rectifier may be increased.

DESCRIPTION OF EXEMPLARY EMBODIMENTS

Figure 1A:
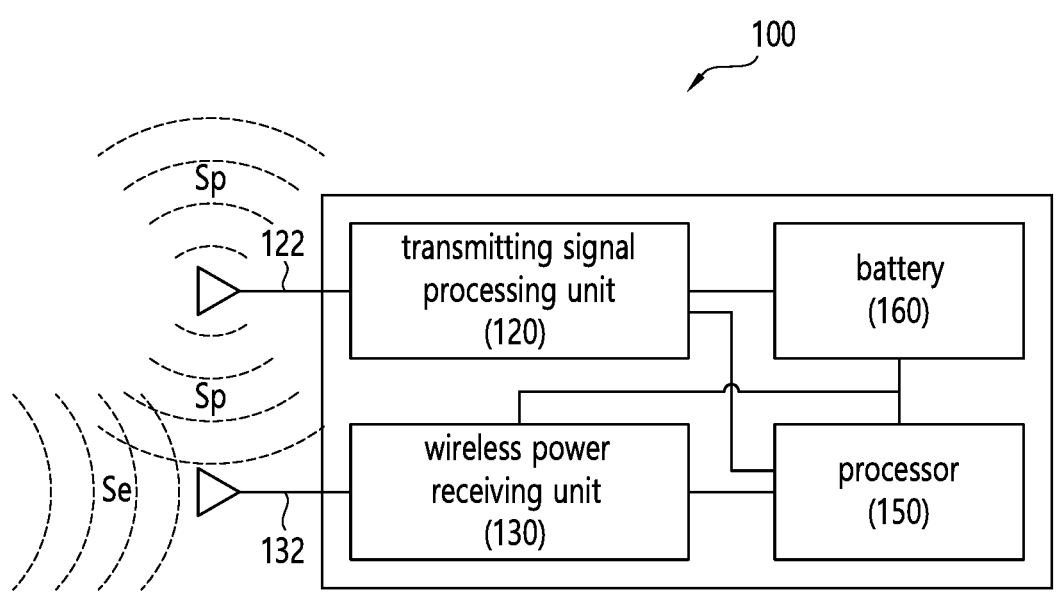
FIG. 1a is a block diagram illustrating a RF based wireless power transmission and reception apparatus according to an embodiment.

The present disclosure may have various modifications and various embodiments and specific embodiments will be illustrated in the drawings and described in detail in the detailed description.

However, this does not limit the present disclosure to specific embodiments, and it is understood that the present disclosure covers all the modifications, equivalents and replacements included within the idea and technical scope of the present disclosure.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

When it is described that a component is "connected to" or "accesses" another component, the component may be directly connected to or access the other component, or a third component may be present there between. In contrast, it is understood that, when it is described that an element is "directly connected to" or "directly access" another element, it is understood that no element is present between the element and another element.

Terms used in the present application are used only to describe specific embodiments and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present application.

Hereinafter, preferred embodiments of the present disclosure will be described in detail with reference to the accompanying drawings and in describing the preferred embodiments with reference to the accompanying drawings, the same reference numeral will refer to the same or corresponding component regardless of the reference numeral and a duplicated description thereof will be omitted.

The apparatus disclosed in the present disclosure receives RF signals emitted by the apparatus again and utilizes it for power charging, which is referred to as simultaneous wireless information and power transfer (SWIPT) scheme or simultaneous information transmission and power reception (SITPR) scheme. The apparatus adopting the scheme is referred to as a SWPT apparatus or a SITPR apparatus. The SWPT apparatus or the SITPR apparatus transmits RF signals (data aspect) or RF power (power aspect), and simultaneously, receives RF signals (data aspect) or RF power (power aspect). Accordingly, in the aspect of transmission of RF signals (or power), the SWPT apparatus or the SITPR apparatus may be a RF based wireless power transmission apparatus, and in the aspect of reception of RF signals (or power), the SWPT apparatus or the SITPR apparatus may be a RF based wireless power reception apparatus. And, in the aspect of performing transmission and reception of RF signals (or power) simultaneously in a single apparatus, the SWPT apparatus or the SITPR apparatus may be a RF based wireless power transmission and reception apparatus. Hereinafter, in the present disclosure, for unifying terms, the SWPT apparatus or the SITPR apparatus is called a RF based wireless power transmission and reception apparatus, but it is apparent that it may be substituted by the SWPT apparatus, the SITPR apparatus, the RF based wireless power transmission apparatus and the RF based wireless power reception apparatus.

FIG. 1a is a block diagram illustrating a RF based wireless power transmission and reception apparatus according to an embodiment.

Referring to FIG. 1a, a RF based wireless power transmission and reception apparatus 100 includes a transmitting signal processing unit 120 for performing modulation and amplification using data input and generating a transmitting signal to be transmitted in RF, at least one transmitting antenna 122 for transforming the transmitting signal to RF signal Sp and transmitting it, at least one receiving antenna 132 for receiving the RF signal Sp, a wireless power receiving unit 130 for harvesting power from the RF signal Sp received through the receiving antenna 132, a processor 150 for generating data input to the transmitting signal processing unit 120 and exchange an internal control signal with being connected to the transmitting signal processing unit 120 and the wireless power receiving unit 130, and a battery 160 for receiving power from the wireless power receiving unit 130, performing charging of power, and supplying power for operating the transmitting signal processing unit 120, the wireless power receiving unit 130 and the processor 150.

The processor 150 may include application-specific integrated circuit (ASIC), other chipset, a logical circuit and/or a data processing device. Although it is not shown, the RF based wireless power transmission and reception apparatus 100 may further include a memory. The memory may include read-only memory (ROM), random access memory (RAM), flash memory, memory card, storage medium and/or other storage device. When the embodiments and the examples of the present disclosure are implemented in software, the embodiments and the examples of the present disclosure may be implemented with a module (process, function, etc.) that performs the function of the present disclosure. The module may be stored in the memory and executed by the processor 150. The memory may be installed interior or exterior of the processor and may be connected to the processor 150 with well-known means.

The at least one receiving antenna 132 may receive an external signal or ambient signal Se existed in the air as well as the RF signal Sp and use it for charging power. As such, since a distance between the at least one transmitting antenna 122 and the at least one receiving antenna 132 is very close, a strength (or magnitude) of the input power of the RF signal Sp received by the at least one receiving antenna 132 becomes relatively greater, and consequently, an efficiency of rectification may be increased. The RF based wireless power transmission and reception apparatus 100 corresponds to the case of not receiving a signal from an external communication apparatus but transmitting a signal only, and accordingly, is not provided with a separate receiving antenna or a receiving signal processing unit.

Figure 1B:
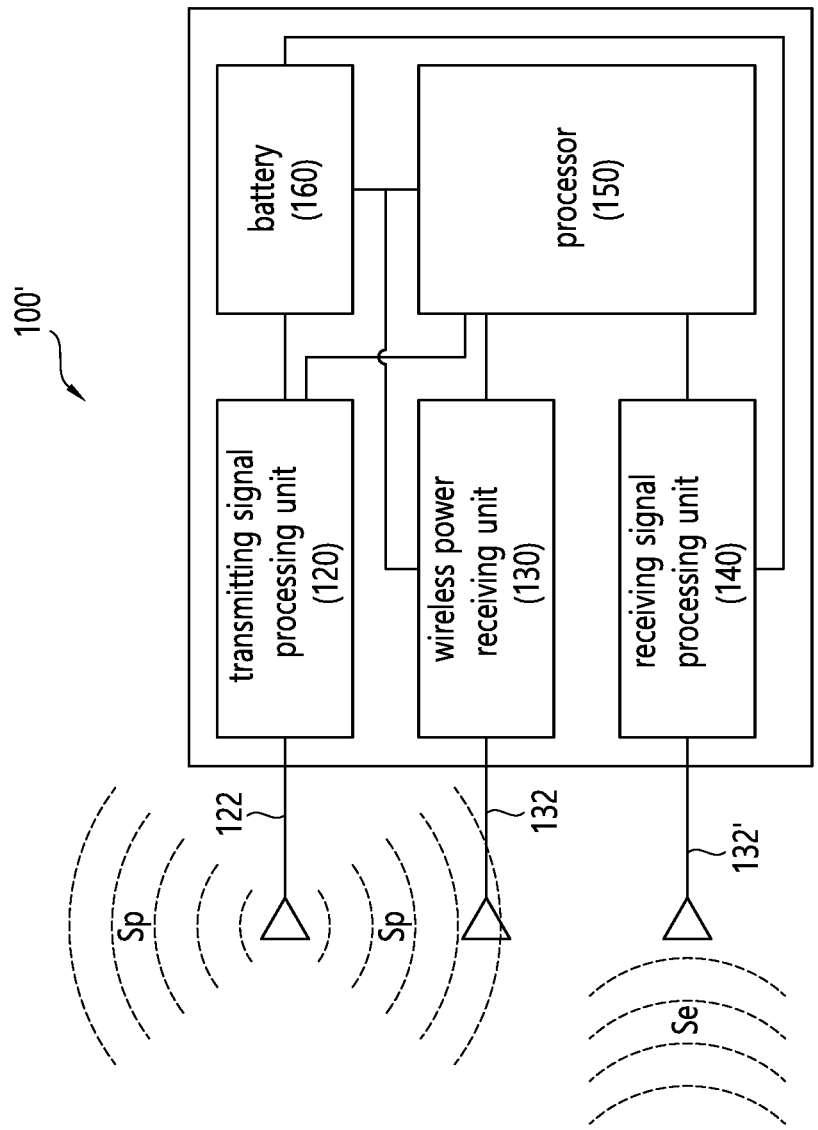
FIG. 1b is a block diagram illustrating a RF based wireless power transmission and reception apparatus according to another embodiment.

Meanwhile, a RF based wireless power transmission and reception apparatus 100' according to another embodiment may further include at least one receiving antenna 132' configured to receive an external signal Se transmitted from an external communication apparatus such as a base station or other user equipment and a receiving signal processing unit 140 for demodulating the external signal Se, as shown in FIG. 1b. Here, in order to distinguish multiple reception antennas, the at least one receiving antenna 132' configured to receive an external signal Se may be called a data receiving antenna, and the at least one receiving antenna 132 for receiving the RF signal Sp and utilizing it as power may be called a power receiving antenna. The power receiving antenna may also be called a dummy antenna in the meaning of not used for receiving original external signal.

Figure 2:
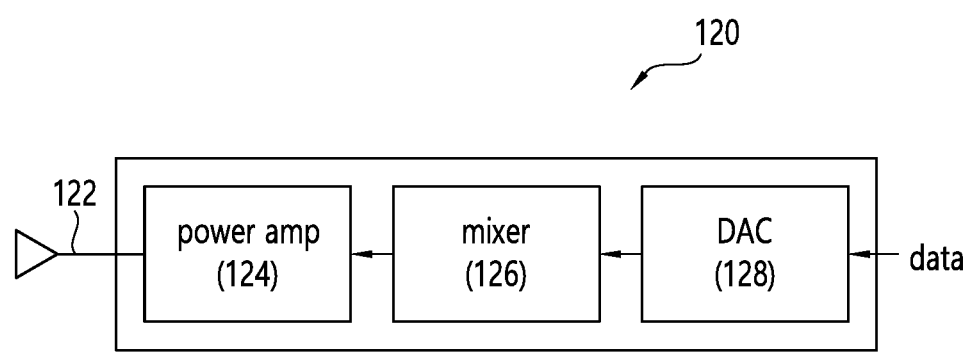
FIG. 2 is a block diagram of a transmitting signal processing unit.
Figure 3:
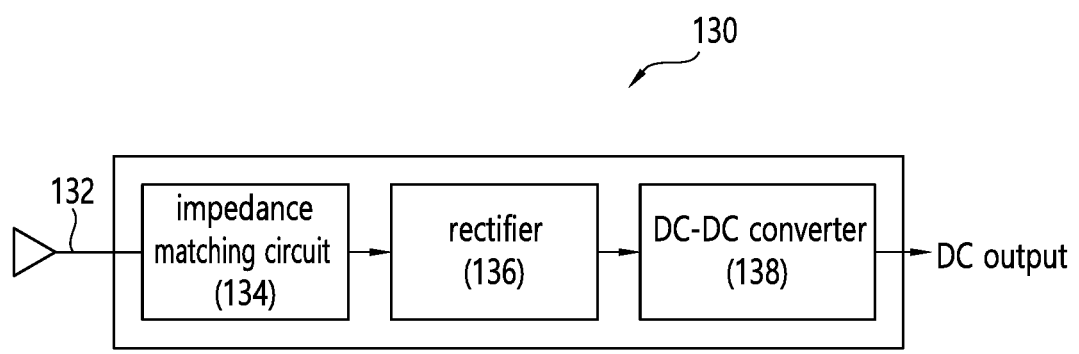
FIG. 3 is a block diagram of a wireless power receiving unit.
Figure 4:
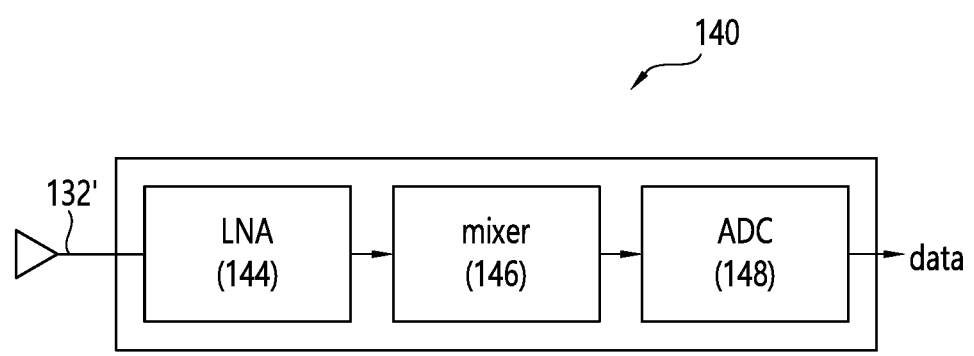
FIG. 4 is a block diagram of a receiving signal processing unit.

FIGS. 2 and 3 are block diagrams the transmitting signal processing unit 120 and the wireless power receiving unit 130 included in the RF based wireless power transmission and reception apparatus 100 of FIG. 1a and the RF based wireless power transmission and reception apparatus 100' of FIG. 1b, respectively, and FIG. 4 is a block diagram of the receiving signal processing unit 140 included in the RF based wireless power transmission and reception apparatus 100' of FIG. 1b.

Referring to FIG. 2, the transmitting signal processing unit 120 includes a digital to analog converter (DAC) 128 for receiving data and transforming it to an analogue signal, a mixer 126 for transforming a frequency of an output signal of the DAC 128 and a power amp 124 for amplifying power of an output signal of the mixer 126.

Referring to FIG. 3, the wireless power receiving unit 130 includes an impedance matching circuit 134 for performing impedance matching with respect to a receiving power, a rectifier 136 for converting AC output of the impedance matching circuit 134 to DC output and a DC-DC converter 138 for adjusting the DC output of the rectifier 136 to a proper level and outputting DC.

Referring to FIG. 4, the receiving signal processing unit 140 includes a low noise amplifier (LNA) 144 for detecting an external signal, a mixer 146 for transforming a frequency of an output signal of the LNA 144 and an analog to digital converter (ADC) 148 for converting an analogue output signal of the mixer 146 and outputting data.

Figure 5:
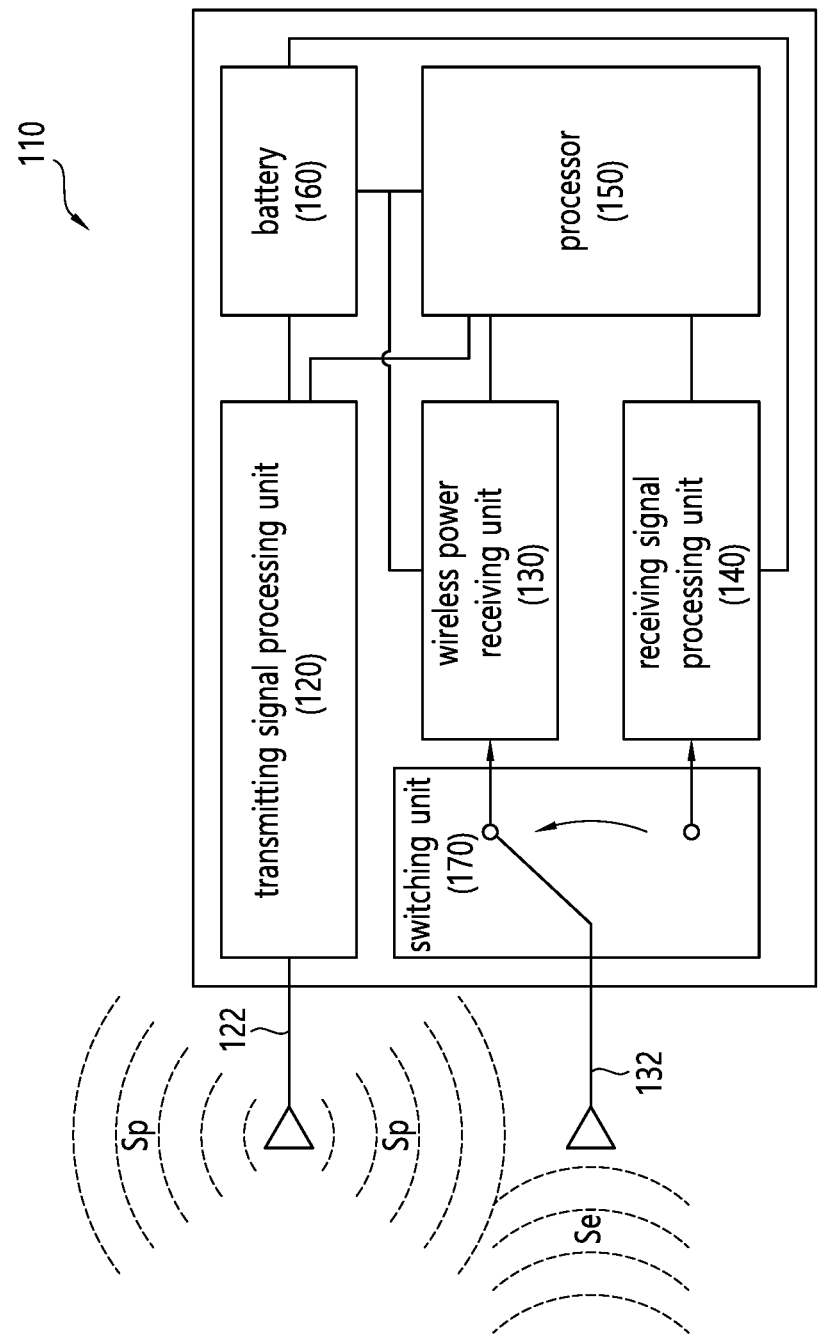
FIG. 5 is a block diagram illustrating a RF based wireless power transmission and reception apparatus according to still another embodiment.

FIG. 5 is a block diagram illustrating a RF based wireless power transmission and reception apparatus according to still another embodiment.

Referring to FIG. 5, a RF based wireless power transmission and reception apparatus 110 includes a transmitting signal processing unit 120 for performing modulation and amplification using data input and generating a transmitting signal to be transmitted in RF, at least one transmitting antenna 122 for transforming the transmitting signal to RF signal Sp and transmitting it, at least one receiving antenna 132 for receiving the RF signal Sp and an external signal Se, a wireless power receiving unit 130 for harvesting power from the RF signal Sp received through the receiving antenna 132, a receiving signal processing unit 140 for demodulating the external signal Se received through the receiving antenna 132, a processor 150 for generating data input to the transmitting signal processing unit 120 and exchange an internal control signal with being connected to the transmitting signal processing unit 120, the wireless power receiving unit 130 and the receiving signal processing unit 140 and storing and interpreting data output from the receiving signal processing unit 140, and a battery 160 for receiving power from the wireless power receiving unit 130, performing charging of power, and supplying power for operating the transmitting signal processing unit 120, the wireless power receiving unit 130, the receiving signal processing unit 140 and the processor 150.

Meanwhile, the RF based wireless power transmission and reception apparatus 110 includes a switching unit 170 for selectively connecting the at least one receiving antenna 132 to the wireless power receiving unit 130 and the receiving signal processing unit 140. That is, the same receiving antenna is configured to be connected to the wireless power receiving unit 130 or the receiving signal processing unit 140 by the switching unit 170. In other words, the wireless power receiving unit 130 and the receiving signal processing unit 140 may share a single receiving antenna by the switching unit 170.

As an example of the operation of the switching unit 170, in the case that the RF based wireless power transmission and reception apparatus 110 is in a wireless power receiving mode, the switching unit 170 connects the at least one receiving antenna 132 to the wireless power receiving unit 130. With this configuration, the RF signal Se and/or the external signal Se received through the at least one receiving antenna 132 is transferred to the wireless power receiving unit 130.

As another example of the operation of the switching unit 170, in the case that the RF based wireless power transmission and reception apparatus 110 is in a data transmission and reception mode, the switching unit 170 connects the at least one receiving antenna 132 to the receiving signal processing unit 140. With this configuration, the external signal Se received through the at least one receiving antenna 132 is transferred to the receiving signal processing unit 140. The signal required by the RF based wireless power transmission and reception apparatus 110 is the external signal Se, and since the RF signal Sp is its own transmitted signal, the RF signal Sp exerts as an interference to the external signal Se. In this case, the receiving signal processing unit 140 may perform an autonomous interference removing algorithm in order to remove the interference owing to the RF signal Sp and detect only the pure external signal Se.

According to the present embodiment, the RF signal Sp emitted by the transmitting antenna of the same apparatus is harvested using the receiving antenna of the same apparatus and reused for wireless charging. A general energy harvesting uses power of the signal transmitted from long range or medium range by assuming that a transmitter and a receiver are independent entities. However, in the present embodiment, the transmitting antenna and the receiving antenna are provided in the same apparatus, there is an effect that energy is harvested in a very short range, eventually. Therefore, it is apparent that an influence due to path loss may be minimized, and an input power of the RF signal Sp transferred to the receiving antenna may be increased. In addition, since the RF signal emitted from the same apparatus is used for data communication, an additional transmission for power charging is not necessary. Furthermore, even in the case that there is a separate transmitter for power charging, since the RF signal emitted from the same apparatus is additionally received together with the RF signal received from the separate transmitter, power received in the receiving antenna may be increased.

Hereinafter, in the case that a RF based wireless power transmission and reception apparatus is provided with a multiple receiving antenna, it is disclosed a method and an antenna arrangement structure for increasing reception power level.

When a wireless charging is performed based on RF signals received through the multiple receiving antenna, a process is required for summing RF signals received through each receiving antenna. However, since the RF signal is AC signal, in the case of summing AC signals input from each receiving antenna, constructive or destructive phenomenon of signal may occur. The construction or destruction of signal is owing to the phase difference of AC signals. Therefore, a phase of each RF signal is important, and in order to increase a receiving power, each RF signal needs to be in-phase. In the case that receiving RF signals are in-phase in each of the receiving antenna, the construction phenomenon of signal occurs, and receiving power is increased. Consequently, the power of input RF signal to a rectifier is increased, and there is an effect of increasing efficiency.

A RF based wireless power transmission and reception apparatus in the present embodiment includes a transmitting antenna and a plurality of receiving antennas, and at least a part of a plurality of receiving antennas is provided at a position in which the RF signal Sp transmitted from the transmitting antenna is received in-phase.

As an example, in order to attain the feature, at least a part of a plurality of receiving antennas are provided at positions of the same distance from the transmitting antenna.

Figure 6:
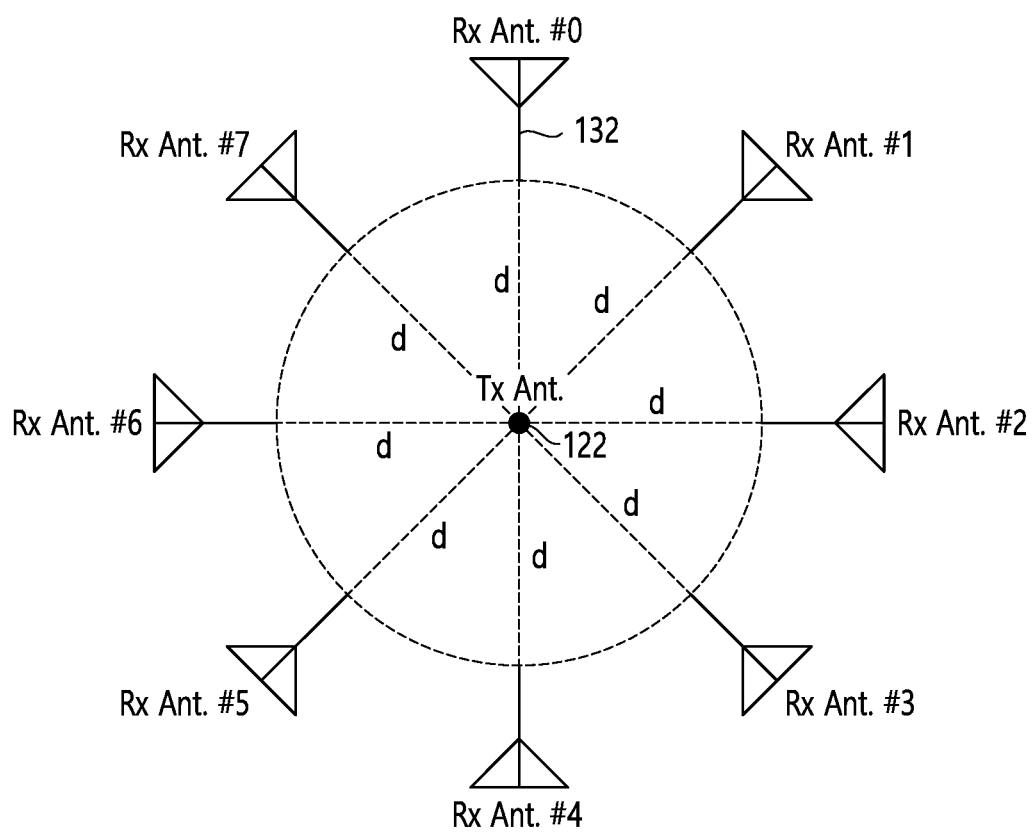
FIG. 6 is an arrangement structure of a transmitting antenna and a receiving antenna of a RF based wireless power transmission and reception apparatus according to an embodiment.

FIG. 6 is an arrangement structure of a transmitting antenna and a receiving antenna of a RF based wireless power transmission and reception apparatus according to an embodiment.

Referring to FIG. 6, around a transmitting antenna Tx Ant 122 at a center, receiving antennas Rx Ant 132 are provided at an arbitrary position of the same distance d. In FIG. 6, it is depicted that all receiving antennas (Rx Ant #0, #1, #2, #3, #4, #5, #6 and #7) are positioned at distance d from the transmitting antenna 122, respectively, but only a part of the receiving antennas may be positioned at distance d. In the case that the receiving antennas 132 are located at the same distance from the transmitting antenna 122, a phase value of a channel from the transmitting antenna 122 to the receiving antenna 132 may be the same. Accordingly, in the case that the receiving antennas are installed at an arbitrary position on a line of a circle having a specific radius around the transmitting antenna 122 at a center, the same distance d may be maintained.

However, as a distance between receiving antennas becomes shorter, mutual coupling influence increases, and consequently, there may be a performance degradation. Accordingly, the receiving antennas are required to be located at positions in which mutual coupling influence is minimized.

As an example, in order to attain the feature, a plurality of receiving antennas may be located at a position in which mutual distance is maximized. For example, as shown in FIG. 6, a plurality of receiving antennas 132 may be located at an equiangular position along a concentric circle of 360 degree. When the number of receiving antennas is N, an angle difference between adjacent receiving antennas becomes 360/N. As shown in FIG. 6, in the case that the number of receiving antennas is 8, receiving antennas #0 to #7 may be arranged in every 45 degree (360/8=45) position which is distant from the transmitting antenna 122 as much as distance d in equiangular manner.

Meanwhile, the feature that at least a part of the plurality of receiving antennas is located at a position for receiving the RF signal Sp transmitted from the transmitting antenna in-phase may be attained by another embodiment.

Figure 7:
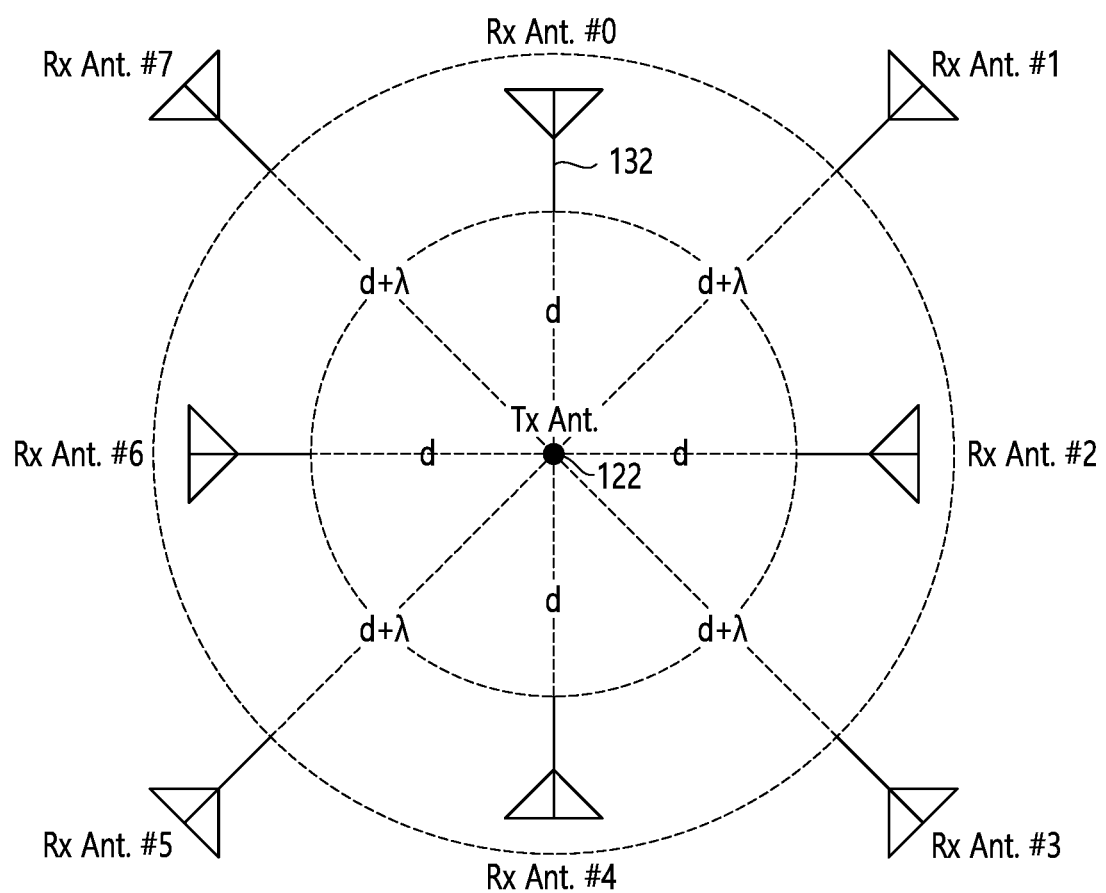
FIG. 7 illustrates an arrangement structure of a transmitting antenna and a receiving antenna of a RF based wireless power transmission and reception apparatus according to an embodiment.

As an example, in order to attain the feature, as shown in FIG. 7, i) all of the at least a part of the plurality of receiving antennas may be located at a position at the same distance from the transmitting antenna, ii) the at least a part of the plurality of receiving antennas may be located at a position at a distance of a multiple of wavelength of the RF signal, or iii) the at least a part of the plurality of receiving antennas may be located at a position at a distance of the same distance and a multiple of wavelength of the RF signal.

FIG. 7 illustrates an arrangement structure of a transmitting antenna and a receiving antenna of a RF based wireless power transmission and reception apparatus according to an embodiment.

Referring to FIG. 7, around a transmitting antenna Tx Ant 122 at a center, receiving antennas Rx Ant 132 are provided at distances $d+n\lambda$, respectively. Here, all of a part of the receiving antennas (#0, #2, #4 and #6) are positioned at the same distance d (n=1). In addition, all of a part of the receiving antennas (#1, #3, #5 and #7) are positioned at an arbitrary position of the same distance $d+\lambda$ (n=1). Here, $\lambda$ is a wavelength. In FIG. 7, n=0 or 1, but a multiple of wavelength may be represented as an arbitrary natural number. Here, distance d may be an arbitrary value not in relation to a wavelength or may be represented as a multiple of k of a wavelength, as $k\lambda$.

As such, in the case that i) all of the receiving antennas may be located at a position at the same distance, ii) the receiving antennas may be located at a position at a distance of a multiple of wavelength of the RF signal, or iii) the receiving antennas may be located at a position at a distance of the same distance and a multiple of wavelength of the RF signal, a phase value of a channel from the transmitting antenna 122 to the receiving antenna 132 may become identical. Accordingly, in the case that a part of the receiving antennas are installed at an arbitrary position on a line of a circle having a first radius d around the transmitting antenna 122 at a center, and another part of the receiving antennas are installed at an arbitrary position on a line of a circle having a first radius $d+\lambda$, maximum power may be harvested.

However, as a distance between receiving antennas becomes shorter, mutual coupling influence increases, and consequently, there may be a performance degradation. Accordingly, the receiving antennas are required to be located at positions in which mutual coupling influence is minimized.

As an example, in order to attain the feature, a plurality of receiving antennas may be located at a position in which mutual distance is maximized. For example, as shown in FIG. 7, a plurality of receiving antennas 132 may be implemented with the structure that the plurality of receiving antennas 132 is located at every equiangular position along a concentric circle of 360 degree. Accordingly, when the number of receiving antennas is N, an angle difference between adjacent receiving antennas becomes 360/N. As shown in FIG. 7, in the case that the number of receiving antennas is 8, receiving antennas #0 to #7 may be arranged in every 45 degree (360/8=45) position which is distant from the transmitting antenna 122 as much as distance d in equiangular manner.

The embodiments of FIG. 6 and FIG. 7 may be more proper to the state that the RF based wireless power transmission and reception apparatus has the structure of FIG. 1a or the state that the receiving antenna 132 and the wireless power receiving unit 130 are connected by the switching unit 170, that is, the case of wireless power receiving mode (in other words, not in the state of data transmission and reception mode). This is because, in the case that a multiple receiving antenna is located at the same distance and/or at positions of multiple of wavelength from the transmitting antenna, a phase value of a channel from the transmitting antenna to the receiving antenna is the same, and the RF signals received for energy harvesting may be tuned with the same phase.

Meanwhile, the RF based wireless power transmission and reception apparatus needs to be also operated in data transmission and reception mode, and in the data transmission and reception mode, the RF based wireless power transmission and reception apparatus according to the embodiments of FIG. 6 and FIG. 7 may experience the situation that its own RF signal Sp causes an interference on the external signal Se. Accordingly, it is required a structure for increasing wireless power receiving efficiency in the wireless power receiving mode and for minimizing interference between the external signal Se and the RF signal Sp in the data transmission and reception mode.

Figure 8:
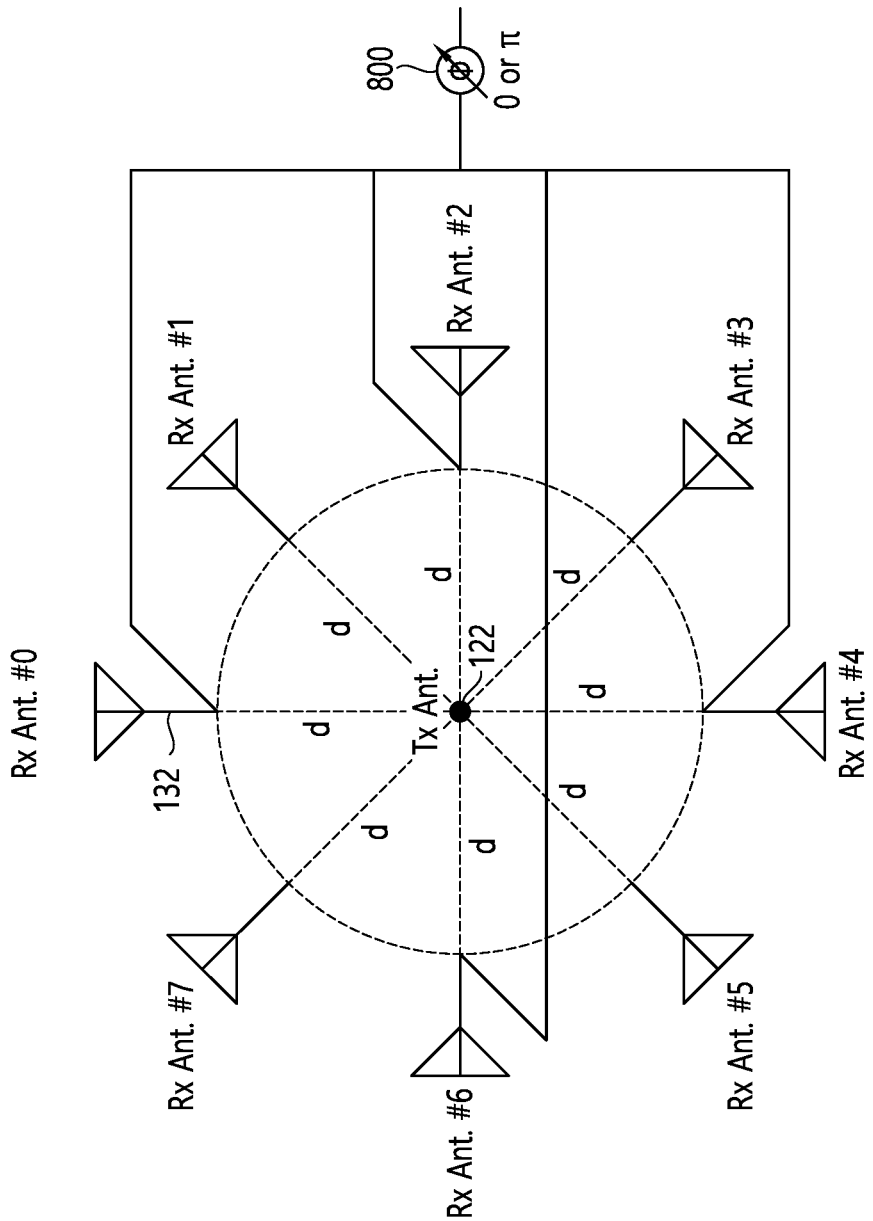
FIG. 8 illustrates an arrangement structure of a transmitting antenna and a receiving antenna of a RF based wireless power transmission and reception apparatus according to another embodiment.
Figure 9:
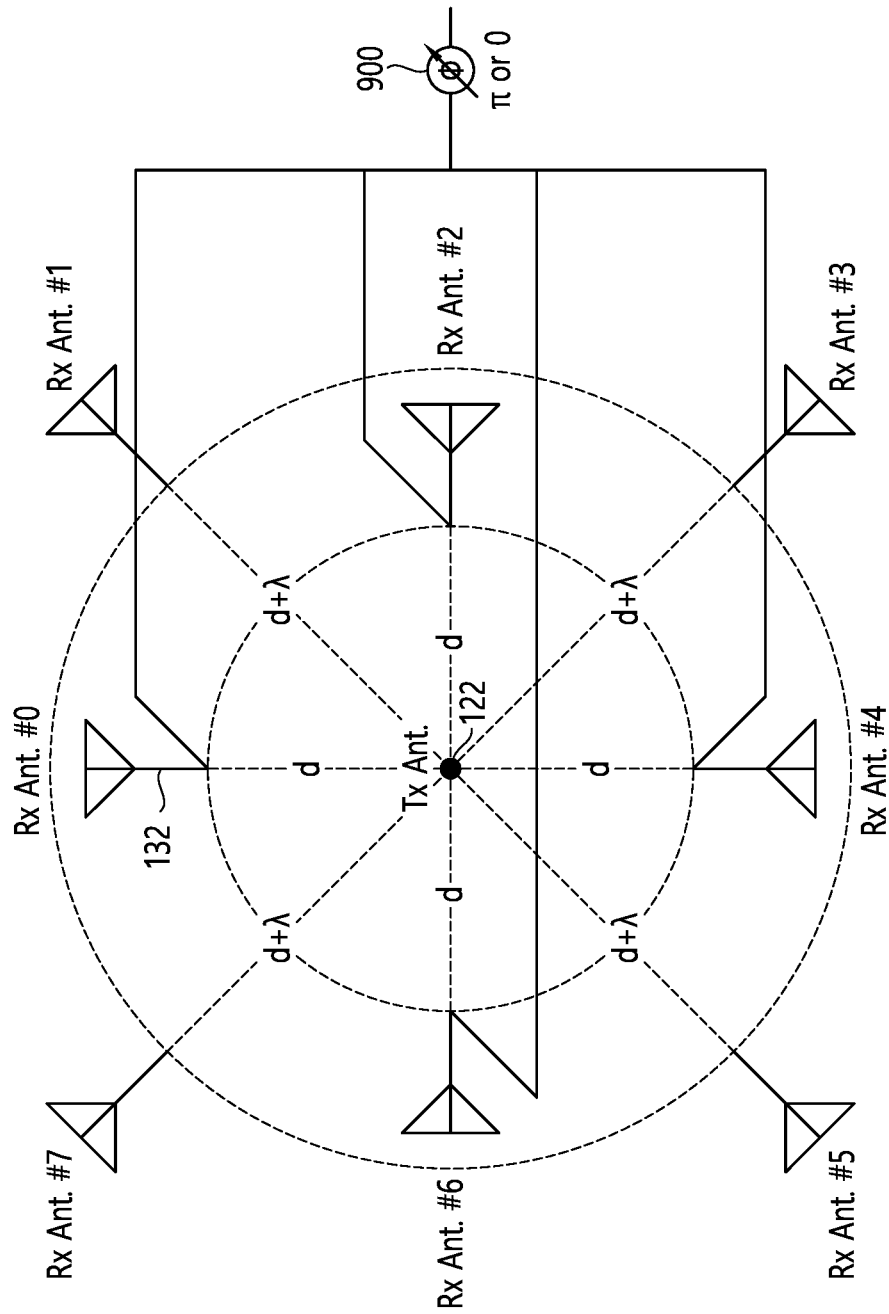
FIG. 9 illustrates an arrangement structure of a transmitting antenna and a receiving antenna of a RF based wireless power transmission and reception apparatus according to another embodiment.

As an example, in order to attain the feature, the RF based wireless power transmission and reception apparatus may further include a phase shifter 800 or 900 as shown in FIG. 8 or FIG. 9. The phase shifter 800 or 900 is connected to at least a part of a plurality of receiving antennas and controls phases in the at least a part of the receiving antennas such that the RF signals received through a plurality of receiving antennas are in-phase in the wireless power receiving mode. In addition, the phase shifter 800 or 900 controls phases in the at least a part of the receiving antennas such that the RF signals received through a plurality of receiving antennas are out-of-phase in the data transmission and reception mode.

Hereinafter, referring to FIG. 8 and FIG. 9, an arrangement structure of the transmitting antenna and the receiving antenna is described in more detail in consideration of the data transmission and reception mode.

FIG. 8 illustrates an arrangement structure of a transmitting antenna and a receiving antenna of a RF based wireless power transmission and reception apparatus according to another embodiment.

Referring to FIG. 8, around a transmitting antenna Tx Ant 122 at a center, receiving antennas Rx Ant 132 are provided at an arbitrary position of the same distance d. In FIG. 8, it is depicted that all receiving antennas (Rx Ant #0, #1, #2, #3, #4, #5, #6 and #7) are positioned at distance d from the transmitting antenna 122, respectively, but only a part of the receiving antennas may be positioned at distance d.

The phase shifter 800 may be connected to the receiving antenna which is at least a part of a plurality of receiving antennas. The number of the receiving antennas connected to the phase shifter 800 may be identical to the number of the receiving antennas which is not connected to the phase shifter 800. Alternatively, the number of a plurality of receiving antennas may be even number. For example, as shown in FIG. 8, there are total 8 receiving antennas, the phase shifter 800 may be connected to 4 receiving antennas #0, #2, #4 and #6 but may not be connected to 4 receiving antennas #1, #3, #5 and #7.

In the wireless power receiving mode, the phase shifter 800 set a phase of the at least a part of the receiving antenna to 0 such that the RF signals received through a plurality of receiving antennas are in-phase. Through this, in the case that the RF signals received through a plurality of receiving antennas becomes in-phase, interference occurs between the RF receiving signals, but maximum power reception is available. However, in the wireless power receiving mode, the condition for available to maximum power reception is preferred, and data interference is not an object for consideration, and accordingly, the phase shifter 800 controls phase of each receiving antenna so as to be the condition that maximum power reception is available.

In the data transmission and reception mode, the phase shifter 800 set a phase of the at least a part of the receiving antenna to 7E such first RF signals received through the at least a part of the receiving antennas are out-of-phase from second RF signals received through the at least another part of the receiving antennas. In the data transmission and reception mode, the condition for available to minimize data interference is preferred, but the condition for available to maximum power reception is not an object for consideration, and accordingly, the phase shifter 800 controls phase of each receiving antenna so as to be the condition that minimize data interference is minimized That is, in the case that the receiving antennas are installed on a line of a circle having a specific radius d around the transmitting antenna 122 at a center, in the data transmission and reception mode, a phase inversion is applied to the RF signal received through a specific receiving antenna, interference signal may be minimized.

However, as a distance between receiving antennas becomes shorter, mutual coupling influence increases, and consequently, there may be a performance degradation. Accordingly, the receiving antennas are required to be located at positions in which mutual coupling influence is minimized.

As an example, in order to attain the feature, a plurality of receiving antennas may be located at a position in which mutual distance is maximized. For example, as shown in FIG. 8, a plurality of receiving antennas 132 may be implemented with the structure that the plurality of receiving antennas 132 is located at every equiangular position along a concentric circle of 360 degree. And, when the number of receiving antennas is N, an angle difference between adjacent receiving antennas becomes 360/N. As shown in FIG. 8, in the case that the number of receiving antennas is 8, receiving antennas #0 to #7 may be arranged in every 45 degree (360/8=45) position which is distant from the transmitting antenna 122 as much as distance d in equiangular manner.

FIG. 9 illustrates an arrangement structure of a transmitting antenna and a receiving antenna of a RF based wireless power transmission and reception apparatus according to another embodiment.

Referring to FIG. 9, around a transmitting antenna Tx Ant 122 at a center, receiving antennas Rx Ant 132 are provided at distances d+n$\lambda$, respectively. Here, all of a part of the receiving antennas (#0, #2, #4 and #6) are positioned at the same distance d (n=1). In addition, all of a part of the receiving antennas (#1, #3, #5 and #7) are positioned at an arbitrary position of the same distance d+$\lambda$ (n=1). Here, $\lambda$ is a wavelength. In FIG. 9, n=0 or 1, but a multiple of wavelength may be represented as an arbitrary natural number. Here, distance d may be an arbitrary value not in relation to a wavelength or may be represented as a multiple of k of a wavelength, as k$\lambda$.

The phase shifter 900 may be connected to the receiving antenna which is at least a part of a plurality of receiving antennas. The number of the receiving antennas connected to the phase shifter 900 may be identical to the number of the receiving antennas which is not connected to the phase shifter 900. Alternatively, the number of a plurality of receiving antennas may be even number. For example, as shown in FIG. 9, there are total 8 receiving antennas, the phase shifter 900 may be connected to 4 receiving antennas #0, #2, #4 and #6 but may not be connected to 4 receiving antennas #1, #3, #5 and #7.

In the wireless power receiving mode, the phase shifter 900 set a phase of the at least a part of the receiving antenna to $\pi$ such that the RF signals received through a plurality of receiving antennas are in-phase. Through this, in the case that the RF signals received through a plurality of receiving antennas becomes in-phase, interference occurs between the RF receiving signals, but maximum power reception is available. However, in the wireless power receiving mode, the condition for available to maximum power reception is preferred, and data interference is not an object for consideration, and accordingly, the phase shifter 900 controls phase of each receiving antenna so as to be the condition that maximum power reception is available.

In the data transmission and reception mode, the phase shifter 900 set a phase of the at least a part of the receiving antenna to 0 such first RF signals received through the at least a part of the receiving antennas are out-of-phase from second RF signals received through the at least another part of the receiving antennas. In the data transmission and reception mode, the condition for available to minimize data interference is preferred, but the condition for available to maximum power reception is not an object for consideration, and accordingly, the phase shifter 900 controls phase of each receiving antenna so as to be the condition that minimize data interference is minimized. As such, in the case that the receiving antennas are installed on a line of a circle having a specific radius d or d+λ around the transmitting antenna 122 at a center, in the wireless power receiving mode, a phase inversion is applied to the RF signal received through a specific receiving antenna, interference signal may be minimized.

However, as a distance between receiving antennas becomes shorter, mutual coupling influence increases, and consequently, there may be a performance degradation. Accordingly, the receiving antennas are required to be located at positions in which mutual coupling influence is minimized.

As an example, in order to attain the feature, a plurality of receiving antennas may be located at a position in which mutual distance is maximized. For example, as shown in FIG. 9, a plurality of receiving antennas 132 may be implemented with the structure that the plurality of receiving antennas 132 is located at every equiangular position along a concentric circle of 360 degree. And, when the number of receiving antennas is N, an angle difference between adjacent receiving antennas becomes 360/N. As shown in FIG. 9, in the case that the number of receiving antennas is 8, receiving antennas #0 to #7 may be arranged in every 45 degree (360/8=45) position which is distant from the transmitting antenna 122 as much as distance d in equiangular manner.

The devices used for energy harvesting are mainly connected to the receiving antenna. The RF based wireless power transmission and reception apparatus according to the present disclosure may be an apparatus available for data transmission/reception (i.e., an apparatus operable in the data transmission and reception mode) as shown in FIG. 5, and accordingly, the receiving antenna also needs to be connected to a receiving RF chain. That is, the switching unit 170 shown in FIG. 5 may connect the receiving antenna 132 to the wireless power receiving unit 130 or the receiving signal processing unit 140 selectively depending on the wireless power receiving mode or the data transmission and reception mode. Hereinafter, referring to FIG. 10, it is described a method for switching (or selecting) the wireless power receiving mode or the data transmission and reception mode in more detail.

Figure 10:
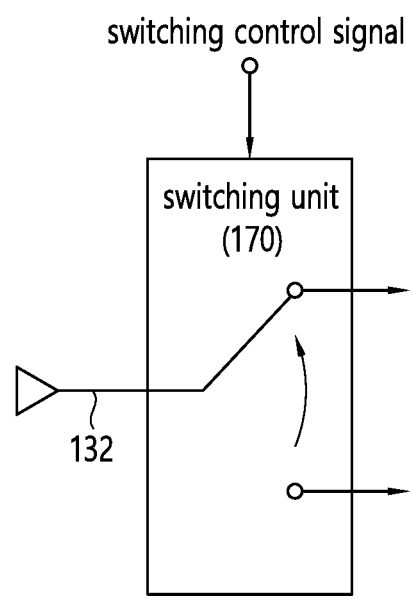
FIG. 10 illustrates a structure and an operation method of the switching unit 170 according to an embodiment.

FIG. 10 illustrates a structure and an operation method of the switching unit 170 according to an embodiment.

Referring to FIG. 10, the switching unit 170 performs a switching between the wireless power receiving mode and the data transmission and reception mode based on a switching control signal. The switching control signal may correspond to either one of the wireless power receiving mode or the data transmission and reception mode. That is, the switching control signal provides a function of triggering or activating either one of the wireless power receiving mode or the data transmission and reception mode.

As an example, the switching control signal may indicate the wireless power receiving mode and the data transmission and reception mode with a digital signal like 1 bit. In the case that the switching control signal is 0 (or SWITCH_OFF), the switching control signal may indicate the data transmission and reception mode, and in the case that the switching control signal is 1 (or SWITCH_ON), the switching control signal may indicate the wireless power receiving mode.

As another example, the switching control signal may be an arbitrary analogue signal, a digital signal, or a combination of an analogue signal and a digital signal in relation to the wireless power receiving mode and the data transmission and reception mode.

In the case that the switching control signal corresponds to the wireless power receiving mode, the switching unit 170 is switched to the wireless power receiving mode. Here, the operation of switching to the wireless power receiving mode may include an operation that the switching unit 170 establishes an electronic connection between the receiving antenna 132 and the wireless power receiving unit 130. The operation of switching to the wireless power receiving mode may further include an operation that the switching unit 170 releases an electronic connection between the receiving antenna 132 and the receiving signal processing unit 140.

In the case that the switching control signal corresponds to the data transmission and reception mode, the switching unit 170 is switched to the data transmission and reception mode. Here, the operation of switching to the data transmission and reception mode includes an operation that the switching unit 170 establishes an electronic connection between the receiving antenna 132 and the receiving signal processing unit 140. The operation of switching to the data transmission and reception mode may further include an operation that the switching unit 170 releases an electronic connection between the receiving antenna 132 and the wireless power receiving unit 130.

Figure 11:
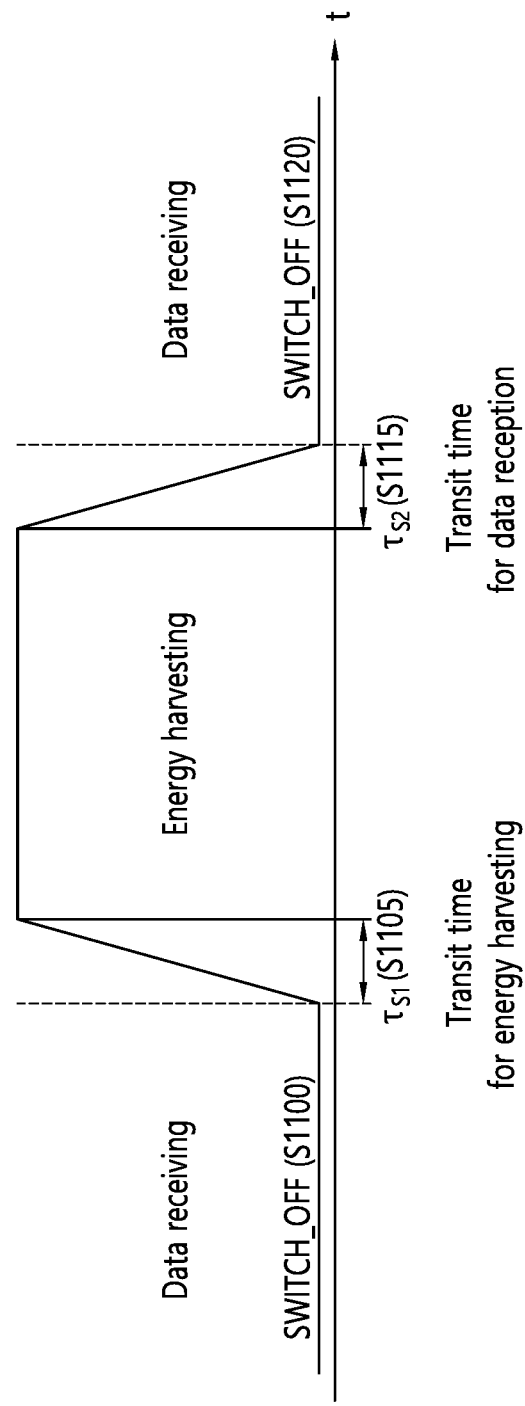
FIG. 11 is a diagram illustrating timing characteristics of data reception and wireless power reception according to the switching operation according to an embodiment.

The timing characteristics of data reception and wireless power reception according to the switching operation of the switching unit 170 according to the switching control signal is as shown in FIG. 11.

FIG. 11 is a diagram illustrating timing characteristics of data reception and wireless power reception according to the switching operation according to an embodiment.

Referring to FIG. 11, first, SWITCHING_OFF (step, S1100) is a state that the switching unit 170 is OFF, and a state in which an electronic connection is established between the receiving antenna 132 and the receiving signal processing unit 140, that is, a state available to receive data (data transmission and reception mode). When the switching control signal changes the switching unit 170 to ON state, the switching unit 170 is switched to ON state through a transit time of τs1 (step, S1105). That is, SWITCHING_ON (step, S1110) is a state that the switching unit 170 is ON, and a state in which an electronic connection is established between the receiving antenna 132 and the wireless power receiving unit 130, that is, a state available to receive wireless power (wireless power receiving mode).

In addition, when the switching control signal changes the switching unit 170 to OFF state, the switching unit 170 is switched to OFF state through a transit time of τs2 (step, S1115). That is, SWITCHING_OFF (step, S1120) is a state that the switching unit 170 is OFF, and a state in which an electronic connection is established between the receiving antenna 132 and the receiving signal processing unit 140, that is, the data transmission and reception mode.

The switching control signal for controlling the switching unit 170 to ON/OFF may be provided by various methods. For example, the switching control signal may be provided by the processor 150 or the transmitting signal processing unit 120 or provided by a separate switching control circuit included in the RF based wireless power transmission and reception apparatus. That is, the switching control circuit and/or the processor 150 may control such that the receiving antenna 132 is connected to the wireless power receiving unit 130 (SWITCH_ON) in a specific condition and control such that the receiving antenna 132 is connected to the receiving signal processing unit 140 (SWITCH_OFF) in another condition which is not overlapped with the specific condition, and accordingly, data reception and energy harvesting may become selectively available.

In the case that the switching control signal is provided by the processor 150, digital information of baseband may be directly input to the switching unit 170 as a switching control signal. In the case that the switching control signal is provided by the separate switching control circuit, the switching control circuit may be implemented as shown in FIG. 12.

Figure 12:
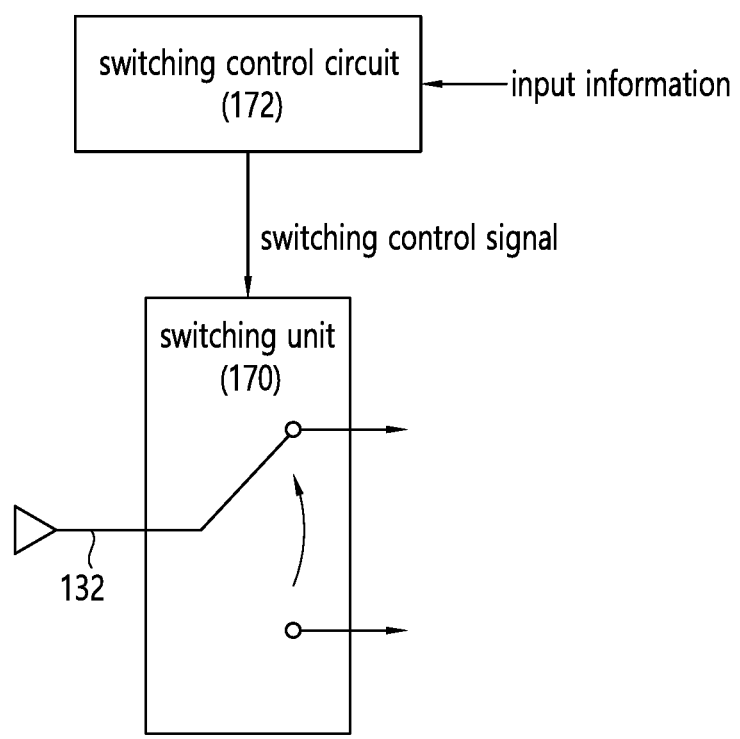
FIG. 12 is a block diagram illustrating a switching unit and a switching control circuit according to an embodiment.

FIG. 12 is a block diagram illustrating a switching unit and a switching control circuit according to an embodiment.

Referring to FIG. 12, a switching control circuit 172 is electrically connected to the switching unit 170 and inputs a switching control signal to the switching unit 170. The switching control circuit 172 may be implemented with an analogue or digital circuit and may also be implemented as a functional module of the processor 150.

In order to generate a switching control signal, the switching control circuit 172 receives at least one of analogue information or digital information as input information. According to the input information, the switching control circuit 172 outputs a switching control signal of a specific value. That is, the input information is information used for determining a switching control signal.

The input information of the switching control circuit 172 may be analogue information. For example, the input information may be one of input or output of the transmitting antenna 122, input or output of the transmitting signal processing unit 120 and output of the processor 150, or a combination thereof.

Depending on input information used in the RF based wireless power transmission and reception apparatus, an output (i.e., switching control signal) of the switching control circuit 172 may be changed. In addition, depending on a position of collecting and detecting predetermined information in RF chain like the transmitting signal processing unit 120, an output (i.e., switching control signal) of the switching control circuit 172 may be changed.

Hereinafter, in the present disclosure, it is described a determination criterion or algorithm for the switching control circuit 172 to control the switching unit 170 by using input information together with embodiments of input information of the switching control circuit 172.

As an example, the input information may be obtained by and based on power of RF signal measured between the power amp 124 and the transmitting antenna 122. Since a leakage of RF signal inevitably occurs between the power amp 124 and the transmitting antenna 122, in the case of using it as the input information, there is an advantage that a separate digital interface therefor is not required.

As an aspect, the switching control circuit 172 may use a strength of RF signal which leaks between the power amp 124 and the transmitting antenna 122 as the input information. For this, the switching control circuit 172 may be provided with a response circuit that responds to the leakage of RF signal. For example, in the case that a strength of leaking RF signal is a predetermined first threshold value (THRESHOLD_1) or greater, the response circuit may respond to the corresponding RF signal (i.e., detect the RF signal). On the other hand, in the case that a strength of leaking RF signal is less than a predetermined first threshold value (THRESHOLD_1), the response circuit may not respond to the corresponding RF signal (i.e., does not detect the RF signal).

Such a response result may be a determination criterion (first determination criterion) for the switching control circuit 172 to control the switching unit 170. For example, in the case that a strength of leaking RF signal is a predetermined first threshold value or greater, the first determination criterion is satisfied. On the other hand, otherwise, the first determination criterion is not satisfied.

As another determination criterion (second determination criterion) for controlling the switching unit 170, receiving scheduling information (RX_SCHEDULING) related to reception of an external signal may be used. The second determination criterion relates to whether the receiving scheduling information is OFF. In the case that the receiving scheduling information is OFF (RX_SCHEDULING_OFF), the second determination criterion is satisfied. In the case that the RF based wireless power transmission and reception apparatus is scheduled to receive data (RX_SCHEDULING_ON), the RF based wireless power transmission and reception apparatus has to receive the corresponding data, the receiving antenna 132 needs to be connected to the receiving signal processing unit 140. In this case, since the RF based wireless power transmission and reception apparatus is in the timing of transmitting a RF signal, even in the case that the first determination criterion is satisfied, unless the second determination criterion is satisfied, the switching control circuit 172 set the switching unit 170 to OFF (the data transmission and reception mode) in order to prevent data loss which is received.

As another aspect, the switching control circuit 172 may use a RF signal of a specific ratio diverged by a coupler as the input information. For this, a coupler (e.g., 20 dB coupler) is provided between the power amp 124 and the transmitting antenna 122, and a predetermined ratio of RF signal may be diverged. In this case, a strength of leaking RF signal in the first determination criterion described above may be replaced by the predetermined ratio of RF signal, and the definition of threshold value or the second determination criterion, and the control operation of the switching unit 170 according the first and second determination criteria are as described above.

In the above description, in the case that the RF based wireless power transmission and reception apparatus is a user equipment (UE) that communicates with a base station (BS), receiving scheduling information may also be called downlink scheduling information. In addition, both the threshold value for SWITCH_ON and the threshold value for SWITCH_OFF are applied to the first threshold value (THRESHOLD_1) in the same way, but it is apparent that the threshold value for SWITCH_ON and the threshold value for SWITCH_OFF may be defined as different values such as THRESHOLD_ON and THRESHOLD_OFF, respectively.

Figure 13:
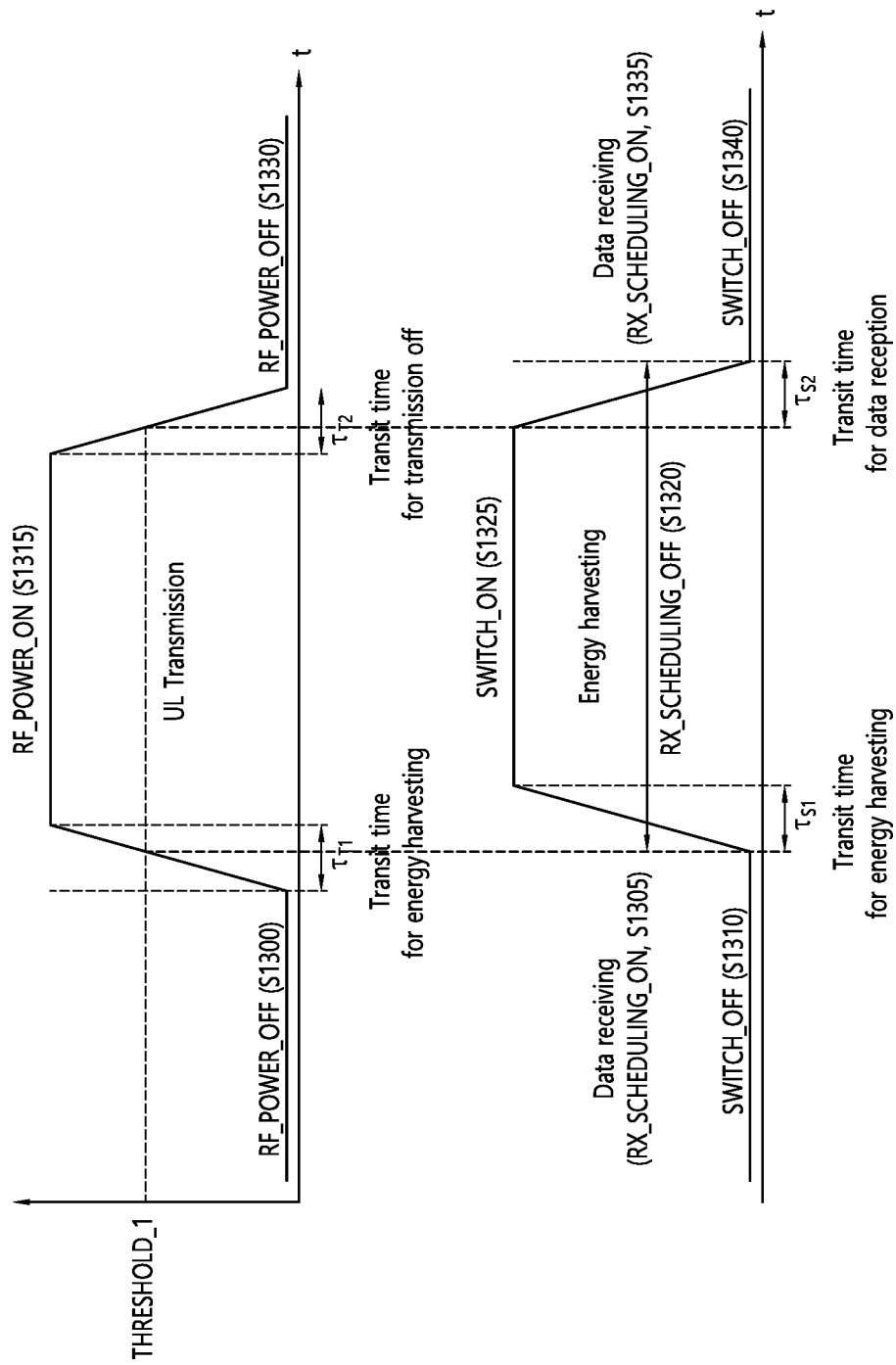
FIG. 13 illustrates a method for controlling a switching unit according to a time flow as an example.

FIG. 13 illustrates a method for controlling a switching unit according to a time flow as an example.

Referring to FIG. 13, the switching control circuit 172 may use a strength of leaking RF signal (RF_POWER_ON or RF_POWER_OFF) and receiving scheduling information (RX_SCHEDULING_ON or RX_SCHEDULING_OFF) as the input information, and check whether the first determination criterion is satisfied based on the leaking RF signal and check whether the second determination criterion is satisfied based on the receiving scheduling information. In the case that the first determination criterion is not satisfied like steps S1300 and S1330 (a strength of leaking RF signal is less than a predetermined specific value (THRESHOLD_1): RF_POWER_OFF) or in the case that the second determination criterion is not satisfied like steps S1305 and S1335 (RX_SCHEDULING_ON), the switching control circuit 172 set the switching unit 170 to OFF (data transmission and reception mode) (steps, S1310 and S1340). On the other hand, in the case that both the first determination criterion and the second determination criterion are satisfied (steps, S1315 and S1320), the switching control circuit 172 set the switching unit 170 to ON (wireless power receiving mode) (step, S1325).

Increase and decrease of RF_POWER may be delayed by hardware characteristics. That is, since a delay time occurs until the RF_POWER is the first threshold value (THRESHOLD_1) or greater, the timing when a switching control signal is actually input to the switching unit 170 is later the timing when the RF_POWER arrives at the first threshold value. Meanwhile, since the switching unit 170 itself may be delayed owing to the hardware characteristics, a transit time $\tau s1$ is consumed until the switching unit 170 receives the switching control signal and switched from OFF to ON. Consequently, a delay time is consumed from the timing when a transmission of RF signal is generated to the timing of starting wireless power based on the RF signal. So does the case that RF_POWER is less than the first threshold value and the switching unit 170 is switched from ON to OFF.

As such, the control of switching unit 170 based on a strength of leaked RF signal or a strength of diverged RF signal uses a leakage of RF signal which inevitably occurs as input information, and accordingly, there is an advantage that a separate digital interface is not required and cost is saved, however, decrease of transmission power and time delay may be caused. Accordingly, hereinafter, as another example, a method for using different source as input information is described.

As another example, the input information may be obtained by diverging a previous signal of the power amp 124 or a signal passing through the mixer 126. The decrease of signal power owing to the division may be compensated by adjusting a boosting gain of the power amp 124. In addition, in front of the power amp 124, information related to a transmission of RF signal may be obtained, for the first determination criterion (whether to transmit RF signal), a lower threshold value (THRESHOLD_2) may be used. Eventually, this provides an effect that wireless power is started with shorter time delay than the time delay of FIG. 13. The detailed description therefor is described with reference to FIG. 14.

Figure 14:
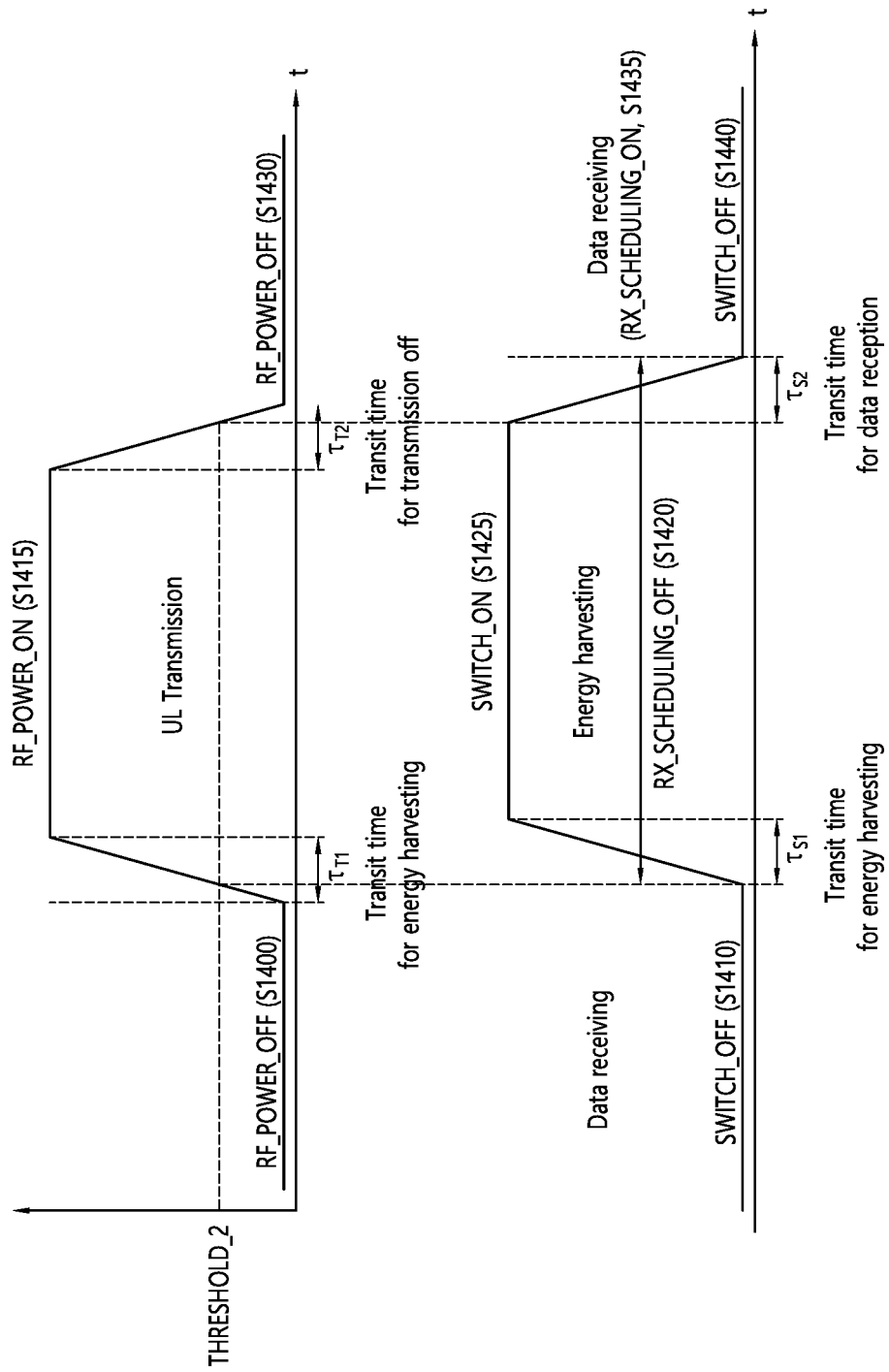
FIG. 14 illustrates a method for controlling a switching unit according to a time flow as another example.

FIG. 14 illustrates a method for controlling a switching unit according to a time flow as another example.

Referring to FIG. 14, the switching control circuit 172 may use a previous signal of the power amp 124 or a signal passing through the mixer 126 (RF_POWER_ON or RF_POWER_OFF) and receiving scheduling information (RX_SCHEDULING_ON or RX_SCHEDULING_OFF) as the input information, and check whether the first determination criterion is satisfied based on a size of RF_POWER and check whether the second determination criterion is satisfied based on the receiving scheduling information. In the case that the first determination criterion is not satisfied like steps S1400 and S1430 (a size of RF_POWER is less than a predetermined specific value (THRESHOLD_2): RF_POWER_OFF) or in the case that the second determination criterion is not satisfied like steps S1405 and S1435 (RX_SCHEDULING_ON), the switching control circuit 172 set the switching unit 170 to OFF (data transmission and reception mode) (steps, S1410 and S1440). On the other hand, in the case that both the first determination criterion and the second determination criterion are satisfied (steps, S1415 and S1420), the switching control circuit 172 set the switching unit 170 to ON (wireless power receiving mode) (step, S1425).

Increase and decrease of RF_POWER may be delayed by hardware characteristics. However, comparing FIG. 13 and FIG. 14, since the second threshold value (THRESHOLD_2) is smaller than the first threshold value (THRESHOLD_1), a delay time until the RF_POWER arrives at each of the threshold values is smaller for the second threshold value. That is, in the case of operating the second threshold value, since a wireless power is started earlier based on a RF signal, the wireless power receiving gain increases. So does the case that RF_POWER is less than the second threshold value and the switching unit 170 is switched from ON to OFF.

In FIG. 13 and FIG. 14, a RF signal is diverged through the coupler, and the diverged RF signal is transmitted through a dedicated line to the switch control circuit 172 and/or a baseband processor, and accordingly, there is an advantage that the first threshold value (THRESHOLD_1) and the second threshold value (THRESHOLD_2) may be calibrated and used. However, there is a trade-off that a delay time to a starting time of wireless charging occurs. Hereinafter, in another example, a method for using different source as input information is described.

As another example, the input information may be digital information before the DAC 128. According to the present embodiment, the digital information before the DAC 128 is used for the input information, and accordingly, a loss of power is not occurred. In addition, since the input information is transferred to the switch control circuit 172 and/or a baseband processor immediately without going through a comparison step with a threshold value, a reception of wireless power is available without delay.

Figure 15:
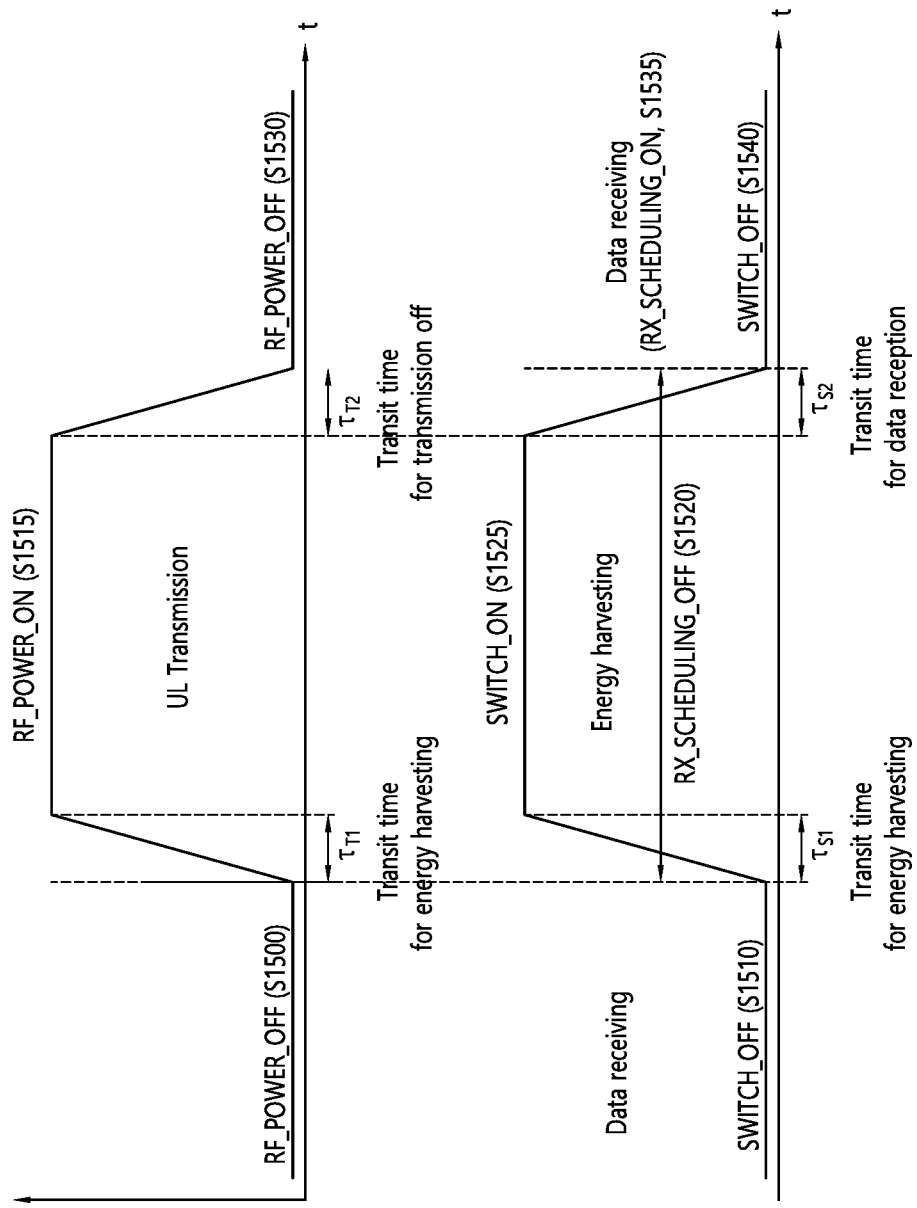
FIG. 15 illustrates a method for controlling a switching unit according to a time flow as another example.

FIG. 15 illustrates a method for controlling a switching unit according to a time flow as another example.

Referring to FIG. 15, the switching control circuit 172 may use digital information before the DAC 128 (indicates RF_POWER_ON or RF_POWER_OFF) and receiving scheduling information (RX_SCHEDULING_ON or RX_SCHEDULING_OFF) as the input information. In the present embodiment, the satisfaction condition for the first determination criterion described above is substituted by the fact that the first determination criterion is satisfied in the case that the digital information indicates RF_POWER_ON. Accordingly, the switching control circuit 172 checks whether the first determination criterion is satisfied based on the indication of the digital information and checks whether the second determination criterion is satisfied based on the receiving scheduling information. In the case that the first determination criterion is not satisfied like steps S1500 and S1530 (digital information=RF_POWER_OFF) or in the case that the second determination criterion is not satisfied like steps S1505 and S1535 (RX_SCHEDULING_ON), the switching control circuit 172 set the switching unit 170 to OFF (data transmission and reception mode) (steps, S1510 and S1540). On the other hand, in the case that both the first determination criterion and the second determination criterion are satisfied (steps, S1515 and S1520), the switching control circuit 172 set the switching unit 170 to ON (wireless power receiving mode) (step, S1525).

In FIG. 13 to FIG. 15, a calculation time for calculating power and a delay occurred when a signal is transferred are ignored for the convenience of description. The calculation time and the delay may be easily reflected by adding the calculation time and the delay time occurred when a signal is transferred to the delay time described in FIG. 13 to FIG. 15.

As described in FIG. 6 to FIG. 10, a plurality of the receiving antennas may be provided. In this case, the switching unit 170 and the switching control circuit 172 described in the present disclosure may be present in each of a plurality of the receiving antennas, or present only one receiving antenna so as to be integrally connected to a plurality of the receiving antennas.

When a plurality of the receiving antennas is used, there is a possibility that the power harvested from a RF signal may increase. However, since the RF signal is an AC signal, in order for several AC signals to be constructed, the several AC signals should be in-phase, and consequently, power of input RF signal to a rectifier may be increased.

As a method for receiving RF signals to be in-phase in a plurality of the receiving antennas, in the present disclosure, together with a physical arrangement of the receiving antennas, the embodiments for the phase shifter 800 or 900 are described with reference to FIG. 6 to FIG. 10.

Hereinafter, with reference to FIG. 16 to FIG. 19, a method for receiving RF signals to be in-phase is described based on feedback loop.

Figure 16:
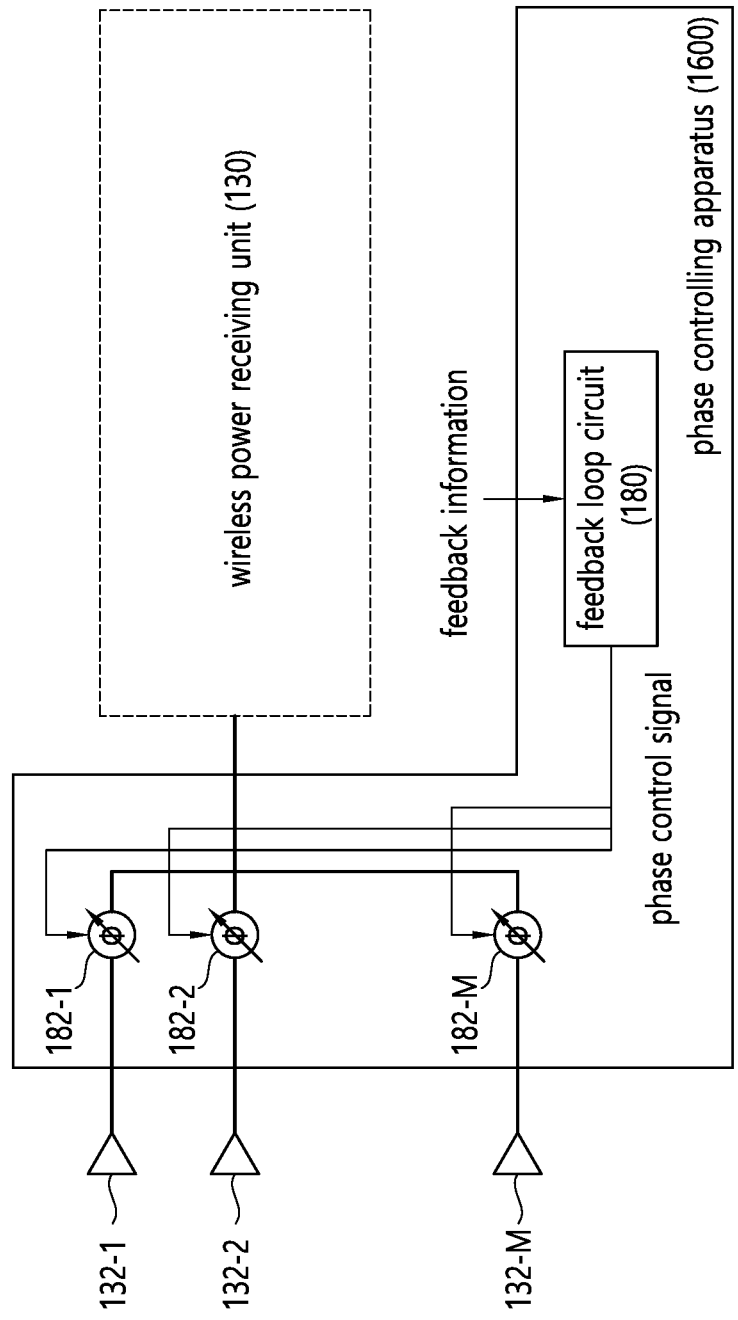
FIG. 16 is a block diagram illustrating a phase controlling apparatus according to an embodiment.

FIG. 16 is a block diagram illustrating a phase controlling apparatus according to an embodiment.

Referring to FIG. 16, a phase controlling apparatus 1600 is included in a RF based wireless power transmission and reception apparatus and makes phases of RF signals input to each of receiving antennas 132-1, 132-2, . . . , 132-M be in-phase.

The phase controlling apparatus 1600 includes phase shifters 182-1, 182-2, . . . , 182-M connected to each of M receiving antennas 132-1, 132-2, . . . , 132-M, respectively and for shifting phase of RF signal input to each of the receiving antennas 132-1, 132-2, . . . , 132-M and a feedback loop circuit 180 for inputting a phase control signal to the phase shifters 182-1, 182-2, . . . , 182-M. Here, it is shown that the number of the phase shifters 182-1, 182-2, . . . , 182-M is M, which is the same number of the receiving antennas, but the phase shifters 182-1, 182-2, . . . , 182-M may be connected to only a part of receiving antennas. In this case, the number of phase shifters may be smaller than M.

The feedback loop circuit 180 generates a phase control signal for each receiving antenna such that receiving RF signals become in-phase in each of the receiving antennas 132-1, 132-2, . . . , 132-M and input it to the corresponding phase shifters 182-1, 182-2, . . . , 182-M. The feedback loop circuit 180 calculates a coefficient value multiplied to each of the phase shifters 182-1, 182-2, . . . , 182-M, and in this meaning, the phase control signal may be a phase coefficient value, and the feedback loop circuit 180 may be called a phase coefficient calculator.

Figure 17:
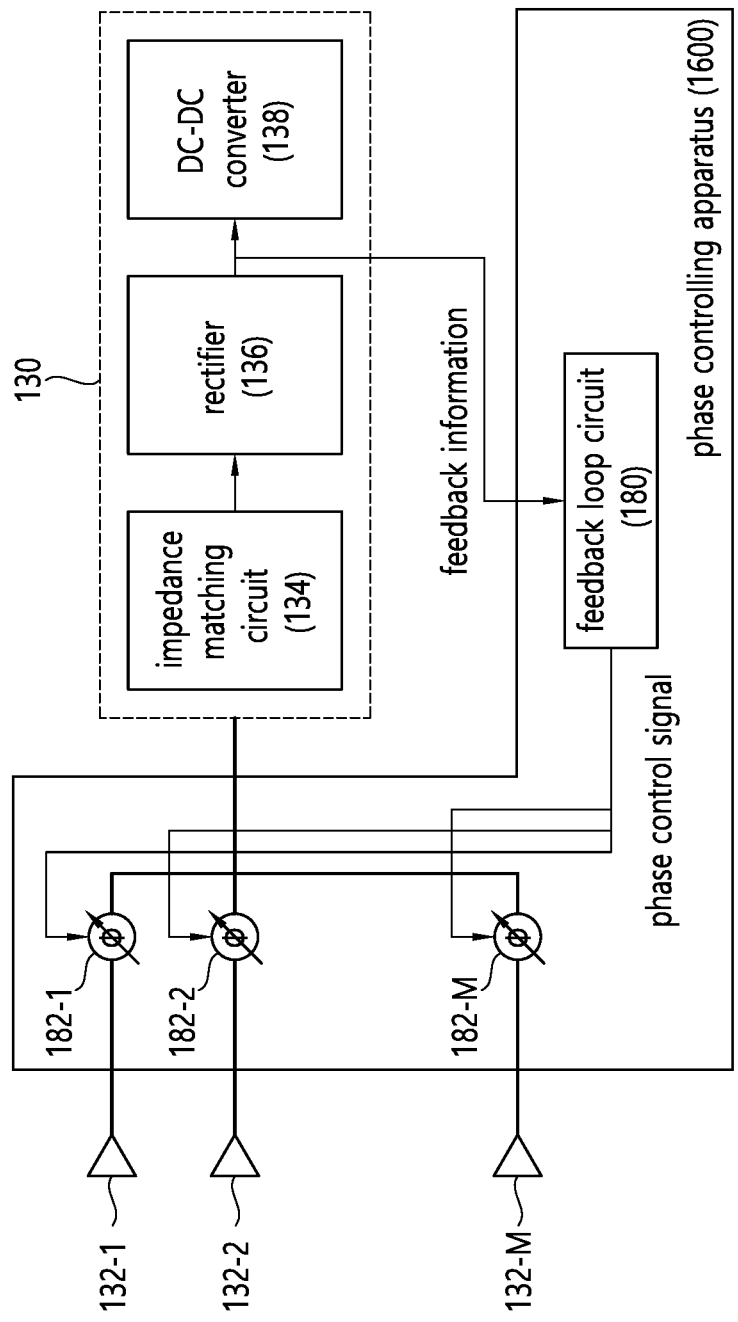
FIG. 17 is a block diagram illustrating a phase controlling apparatus according to another embodiment.

The feedback information may be a DC output of the rectifier 136 in the wireless power receiving unit 130 as shown in FIG. 17. In this case, the feedback loop circuit 180 receives a DC output of the rectifier 136, calculates a feedback loop that increases the DC output, predicts a phase coefficient value of the phase shifters 182-1, 182-2, . . . , 182-M of each receiving antenna, and then, generate a phase control signal. According to such a feedback loop, the existing phase control signal may be continually updated depending on RF channel situation.

As an example, the feedback loop circuit 180 may calibrate a combination of phase coefficient values proper to each receiving antenna and derive a lookup table based on the combination of the respective phase coefficient values. The feedback loop circuit 180 may select and use a specific value in the lookup table.

As another example, the feedback loop circuit 180 may monitor increase or decrease of DC power of the rectifier 136 while increasing or decreasing a value of the phase control signal input to a phase shifter among the plurality of phase shifters. The feedback loop circuit 180 may perform the same operation for different phase shifters periodically and derive an optimal value of phase coefficient value of each phase shifter in real time.

The method for configuring in-phase according to the present embodiment is accompanied with a process of finding an optimal value experimentally based on information in which summation of receiving RF signals of entire receiving antenna is switched to DC output through the rectifier 136. Accordingly, it is hard to estimate a phase coefficient value in each of the phase shifters 182-1, 182-2, . . . , 182-M individually.

Figure 18:
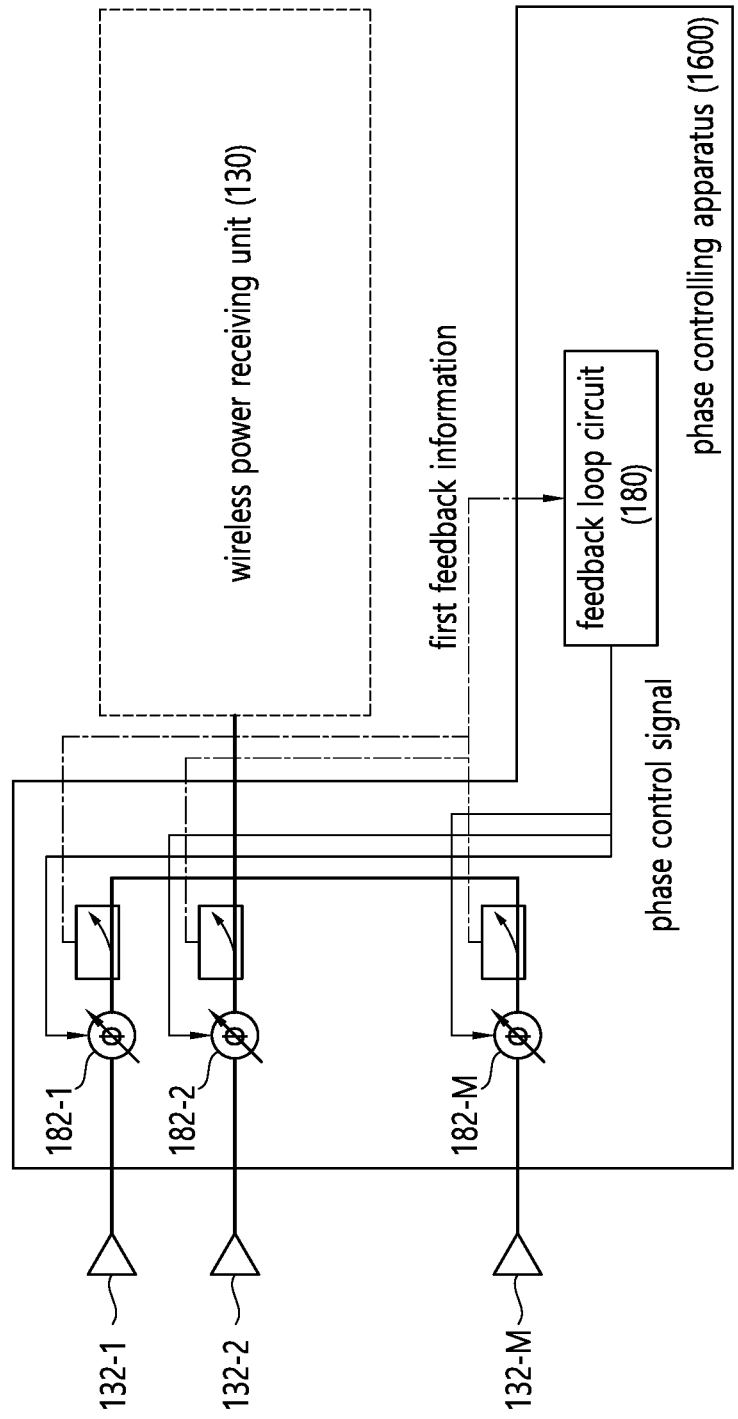
FIG. 18 is a block diagram illustrating a phase controlling apparatus according to another embodiment.

FIG. 18 is a block diagram illustrating a phase controlling apparatus according to another embodiment.

Referring to FIG. 18, a phase controlling apparatus 1800 is included in a RF based wireless power transmission and reception apparatus and makes phases of RF signals input to each of receiving antennas 132-1, 132-2, . . . , 132-M be in-phase.

The phase controlling apparatus 1800 includes phase shifters 182-1, 182-2, . . . , 182-M connected to each of M receiving antennas 132-1, 132-2, . . . , 132-M, respectively and for shifting phase of RF signal input to each of the receiving antennas 132-1, 132-2, . . . , 132-M, couplers 184-1, 184-2 and 184-M for diverging receiving RF signals going through the phase shifters 182-1, 182-2, . . . , 182-M and inputting it to the feedback loop circuit 180, and a feedback loop circuit 180 for inputting a phase control signal to the phase shifters 182-1, 182-2, . . . , 182-M. Here, it is shown that the number of the phase shifters 182-1, 182-2, . . . , 182-M is M, which is the same number of the receiving antennas, but the phase shifters 182-1, 182-2, . . . , 182-M may be connected to only a part of receiving antennas. In this case, the number of phase shifters may be smaller than M.

The feedback loop circuit 180 generates a phase control signal for each receiving antenna such that receiving RF signals become in-phase in each of the receiving antennas 132-1, 132-2, . . . , 132-M based on feedback information and input it to the corresponding phase shifters 182-1, 182-2, . . . , 182-M. The feedback loop circuit 180 calculates a coefficient value multiplied to each of the phase shifters 182-1, 182-2, . . . , 182-M.

The feedback information may be a RF signal diverged by the couplers 184-1, 184-2 and 184-M after going through the phase shifters 182-1, 182-2, . . . , 182-M. In this case, the feedback loop circuit 180 receives the diverged RF signal as feedback information, estimates a phase from the input RF signal, predicts a phase coefficient value of each of the phase shifters 182-1, 182-2, . . . , 182-M that increases a DC input of the rectifier, and then, generate a phase control signal. According to such a feedback loop, the existing phase control signal may be continually updated depending on RF channel situation.

As an example, the feedback loop circuit 180 predicts and compensates a phase in a unit of RF signal received to a single receiving antenna-coupler, first, and then, sequentially predicts and compensates a phase of other RF signal of the other receiving antenna-coupler, and accordingly, the power consumption owing to the division of RF signal may be minimized.

According to the method for configuring in-phase according to the present embodiment, a part of RF signal diverged from the RF signal going through the phase shifters 182-1, 182-2, . . . , 182-M is analyzed as the feedback information, and accordingly, it is relatively easy to estimate a phase coefficient value in each phase shifter. However, different from the embodiment of FIG. 17, it is hard to know a final DC output, and the power consumption of the coupler may be burdensome.

Figure 19:
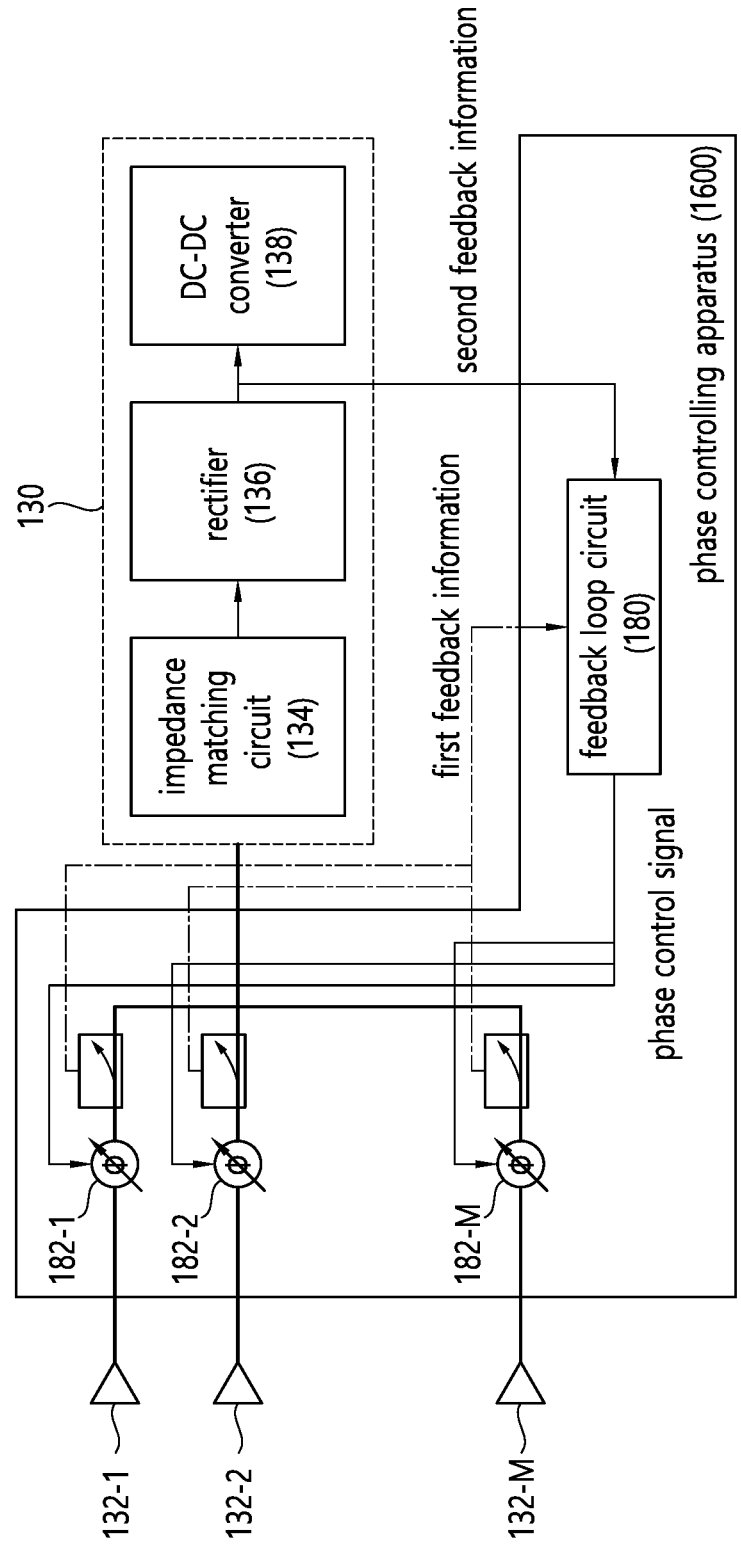
FIG. 19 is a block diagram illustrating a phase controlling apparatus according to another embodiment.

FIG. 19 is a block diagram illustrating a phase controlling apparatus according to another embodiment.

Referring to FIG. 19, a phase controlling apparatus 1900 is included in a RF based wireless power transmission and reception apparatus and makes phases of RF signals input to each of receiving antennas 132-1, 132-2, . . . , 132-M be in-phase.

The phase controlling apparatus 1900 includes phase shifters 182-1, 182-2, . . . , 182-M connected to each of M receiving antennas 132-1, 132-2, . . . , 132-M, respectively and for shifting phase of RF signal input to each of the receiving antennas 132-1, 132-2, . . . , 132-M, couplers 184-1, 184-2 and 184-M for diverging receiving RF signals going through the phase shifters 182-1, 182-2, . . . , 182-M and inputting it to the feedback loop circuit 180, and a feedback loop circuit 180 for inputting a phase control signal to the phase shifters 182-1, 182-2, . . . , 182-M. Here, it is shown that the number of the phase shifters 182-1, 182-2, . . . , 182-M is M, which is the same number of the receiving antennas, but the phase shifters 182-1, 182-2, . . . , 182-M may be connected to only a part of receiving antennas. In this case, the number of phase shifters may be smaller than M.

The feedback loop circuit 180 generates a phase control signal for each receiving antenna such that receiving RF signals become in-phase in each of the receiving antennas 132-1, 132-2, . . . , 132-M based on first feedback information and second feedback information and input it to the corresponding phase shifters 182-1, 182-2, . . . , 182-M. The feedback loop circuit 180 calculates a coefficient value multiplied to each of the phase shifters 182-1, 182-2, . . . , 182-M.

The first feedback information may be a RF signal diverged by the couplers 184-1, 184-2 and 184-M after going through the phase shifters 182-1, 182-2, . . . , 182-M. The second feedback information may be a DC output of the rectifier 136 in the wireless power receiving unit 130.

The feedback loop circuit 180 receives the diverged RF signal as the first feedback information and estimates a phase from the input RF signal. In addition, the feedback loop circuit 180 calculates a feedback loop that increases the DC input of the rectifier 136 based on the estimated phase and the second feedback information, predicts a phase coefficient value of each of the phase shifters 182-1, 182-2, . . . , 182-M of each receiving antenna, and then, generate a phase control signal. According to such a feedback loop, the existing phase control signal may be continually updated depending on RF channel situation.

As an example, the feedback loop circuit 180 predicts and compensates a phase in a unit of RF signal received to a single receiving antenna-coupler, first, and then, sequentially predicts and compensates a phase of other RF signal of the other receiving antenna-coupler, and accordingly, the power consumption owing to the division of RF signal may be minimized.

According to the method for configuring in-phase according to the present embodiment, it is available to know a final DC output by the feedback loop, an adaptive phase control is available. In addition, a part of RF signal diverged from the RF signal going through the phase shifters 182-1, 182-2, . . . , 182-M is analyzed as the feedback information, and accordingly, it is easy to estimate a phase coefficient value in each phase shifter.

Figure 20:
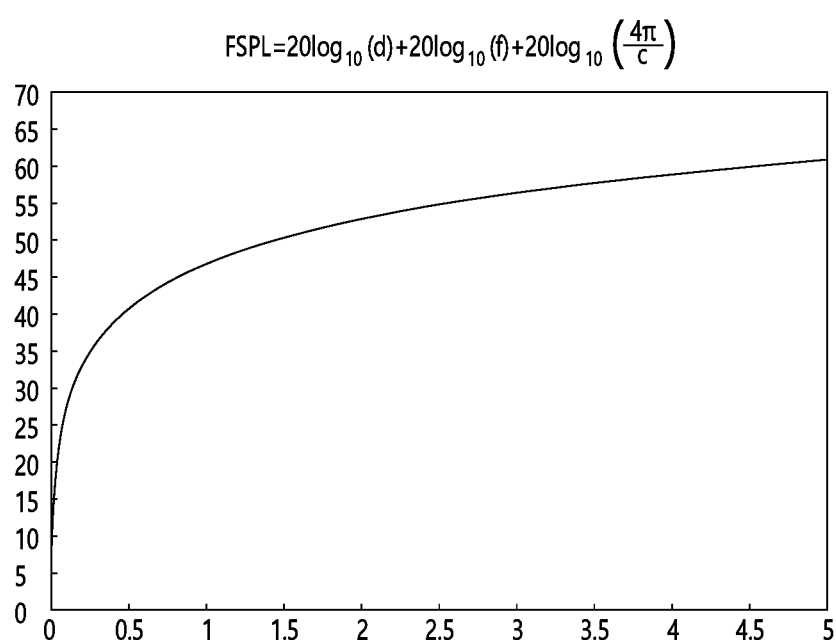
FIG. 20 illustrates an example of a mathematical expression representing a path loss attenuation in a free space and an attenuation curve depending on a distance.

FIG. 20 illustrates an example of a mathematical expression representing a path loss attenuation in a free space and an attenuation curve depending on a distance.

As shown in FIG. 20, in the case that there is a distance difference of 1 m between a transmitting antenna and a receiving antenna, an attenuation of about 47 dB occurs, and in the case that there is a distance difference of 2 m, an attenuation of about 53 dB occurs. Furthermore, in a general cellular environment, since a distance difference between a transmitting antenna and a receiving antenna is great, there is greater path loss attenuation. However, in the case that the method and apparatus for performing transmission and reception of wireless power according to the present disclosure is applied to a small mobile device such as a smart phone, a distance between a transmitting antenna and a receiving antenna is expected to be within a few centimeters, it is identified that a path loss attenuation of greater or smaller than 15 to 25 dB. Particularly, in the case that a distance between a transmitting antenna and a receiving antenna is less than 5 cm, there is a path loss attenuation less than 20 dB.

In order for a RF signal that undergoes a path loss attenuation and is input to a power receiving antenna to be utilized as power, a process is required to be converted to DC through a rectifier in a wireless power receiver. As the path loss attenuation decreases, a size of RF signal input to the rectifier in the wireless power receiver increases, and there is an effect that input/output efficiency in the rectifier circuit increases.

Figure 21:
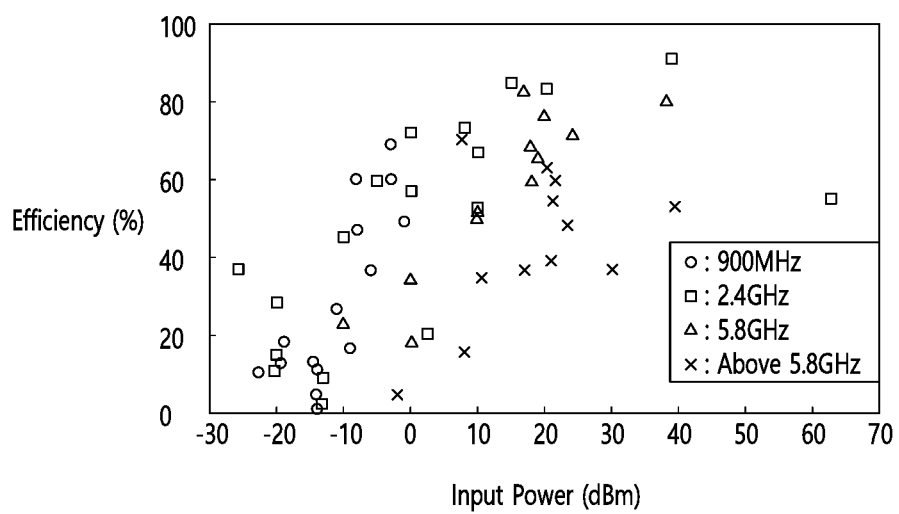
FIG. 21 illustrates an example of a relation between an input power and an output efficiency depending on various frequencies.

FIG. 21 illustrates an example of a relation between an input power and an output efficiency depending on various frequencies.

Referring to FIG. 21, an efficiency of rectifier is relatively linear depending on an input power, and in addition, an efficiency of rectifier has a value of 40% or lower in the case that an input power is negative dBm, and accordingly, a problem may occur in charging. However, according to the method and apparatus for performing transmission and reception of wireless power according to the present disclosure, a path loss attenuation is small, and an input/output efficiency in a rectifier circuit becomes increased.

So far, the present disclosure is described with reference to drawings and embodiments. However, it is understood that the scope of the present disclosure is not limited to the drawings and the embodiments, and those skilled in the art may modify and change the present disclosure in various ways within the scope not departing from the concept and the scope of the present disclosure written in the following claims.

What is claimed is:

1. A radio frequency (RF) based wireless power transmission and reception apparatus, comprising:
   a transmitting signal processing unit configured to generate a transmitting data signal and perform modulation and amplification of the transmitting data signal;

a transmitting antenna configured to transform the transmitting data signal to an RF signal and transmit the RF signal;

a plurality of receiving antennas configured to receive at least one of the RF signal and an external signal from a location external to the wireless power transmission and reception apparatus;

a wireless power receiving unit configured to harvest power from the RF signal received through at least one of the plurality of receiving antennas; and a receiving signal processing unit configured to demodulate the external signal received through at least one of the receiving antennas, wherein the plurality of receiving antennas are provided at positions where mutual coupling is minimized, and wherein the positions where mutual coupling is minimized include equiangular positions around a circle centered on the transmitting antenna.

2. The apparatus of claim 1, wherein the plurality of receiving antennas include a power receiving antenna configured to receive the RF signal and a data receiving antenna configured to receive the external signal, wherein the power receiving antenna is connected to the wireless power receiving unit, and wherein the data receiving antenna is connected to the receiving signal processing unit.

3. The apparatus of claim 1, wherein the plurality of receiving antennas are provided at positions for receiving the RF signal in-phase from the transmitting antenna.

4. The apparatus of claim 3, wherein the positions for receiving the RF signal in-phase include positions which are all of equal distance from the transmitting antenna.

5. The apparatus of claim 3, wherein the positions for receiving the RF signal in-phase include at least one position in which a distance between the transmitting antenna and the respective receiving antenna corresponds to an integer multiple of a wavelength of the RF signal.

6. The apparatus of claim 1, further comprising a phase shifter connected to each of the plurality of receiving antennas configured to shift a phase of the RF signal or the external signal received through the corresponding receiving antenna.

7. The apparatus of claim 6, wherein all distances between the transmitting antenna and respective receiving antennas are identical, based on only the RF signal being received through the connected receiving antenna, the phase shifter skips shift a phase of the RF signal, and based on the RF signal and the external signal being received through the connected receiving antenna simultaneously, the phase shifter shifts phases of the RF signal and the external signal by 180 degree.

8. The apparatus of claim 6, wherein distances between the transmitting antenna and respective receiving antennas correspond to an integer multiple of a wavelength of the RF signal, based on only the RF signal being received through the connected receiving antenna, the phase shifter shifts a phase of the RF signal by 180 degree, and based on the RF signal and the external signal being received through the connected receiving antenna simultaneously, the phase shifter skips shift phases of the RF signal and the external signal.

9. The apparatus of claim 1, further comprising a switching unit configured to perform switching that connects each of the plurality of receiving antennas to either one of the wireless power receiving unit or the receiving signal processing unit selectively.

10. The apparatus of claim 9, wherein the switching unit performs the switching according to a switching control signal generated based on at least one of information related to a transmission of the RF signal or information related to a reception of the external signal.

11. The apparatus of claim 10, wherein the information related to a transmission of the RF signal is information representing a result of comparing an input source to the transmitting antenna or an input source in the transmitting signal processing unit with a threshold value.

12. The apparatus of claim 11, wherein the information related to a reception of the external signal includes scheduling information for a schedule for the RF based wireless power transmission and reception apparatus to receive the external signal.

13. The apparatus of claim 12, wherein the switching control signal is turned ON based on the input source being the threshold value or greater and the scheduling information is not related to the reception of the external signal, and wherein the switching unit connects each of the receiving antennas to the wireless power receiving unit based on that the switching control signal is turned ON.

14. The apparatus of claim 6, further comprising a feedback loop circuit configured to generate a phase control signal based on feedback information and input the phase control signal to the phase shifter.

15. The apparatus of claim 14, wherein the wireless power receiving unit is configured to generate a DC output by rectifying the RF signal, and wherein the feedback information is at least one of the DC output or a phase estimation value of the RF signal.

16. The apparatus of claim 15, further comprising a coupler for diverging a part of RF signal from the RF signal going through the phase shifter, wherein the feedback loop circuit estimates a phase of the RF signal from the diverged RF signal.

* * * * *